United States Patent
Kim et al.

(10) Patent No.: US 10,051,580 B2
(45) Date of Patent: *Aug. 14, 2018

(54) POWER CONTROL METHOD AND APPARATUS IN WIRELESS ACCESS SYSTEM

(71) Applicant: LG ELECTRONICS INC., Seoul (KR)

(72) Inventors: Bonghoe Kim, Seoul (KR); Dongyoun Seo, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,688

(22) Filed: Jan. 10, 2017

(65) Prior Publication Data

US 2017/0150457 A1     May 25, 2017

Related U.S. Application Data

(63) Continuation of application No. 14/782,750, filed as application No. PCT/KR2014/003461 on Apr. 21, 2014, now Pat. No. 9,565,640.

(Continued)

(51) Int. Cl.
*H04B 7/00* (2006.01)
*H04W 52/32* (2009.01)
(Continued)

(52) U.S. Cl.
CPC ......... *H04W 52/325* (2013.01); *H04L 5/0057* (2013.01); *H04W 72/042* (2013.01);
(Continued)

(58) Field of Classification Search
CPC .......................... H04W 52/146; H04J 3/1694
(Continued)

(56) References Cited

U.S. PATENT DOCUMENTS

| 8,428,521 B2 | 4/2013 | Luo et al. |
| 8,958,357 B2 | 2/2015 | Dalsgaard et al. |

(Continued)

FOREIGN PATENT DOCUMENTS

| CN | 10247483 A | 5/2012 |
| CN | 102958146 A | 3/2013 |

(Continued)

OTHER PUBLICATIONS

Intel Corporation, "PUCCH Transmission in Small Cell Environment," 3GPP TSG RAN WG1 Meeting #72bis, Chicago, USA, Apr. 15-19, 2013 (downloaded by EPO on Apr. 6, 2013), R1-130918, 4 pages.

(Continued)

*Primary Examiner* — Sonny Trinh
(74) *Attorney, Agent, or Firm* — Birch, Stewart, Kolasch & Birch, LLP

(57) ABSTRACT

A method for controlling uplink transmit power of a user equipment (UE) in a radio access system supporting a multi-connectivity mode, the method performed by the UE and comprising: receiving two or more higher layer signals including first power parameters from two or more serving cells; receiving two or more physical downlink control channels (PDCCHs) including a second power parameter from the two or more serving cells; measuring path loss values of the two or more serving cells, calculating two or more physical uplink control channel (PUCCH) transmit powers for each of the two or more serving cells in the multi-connectivity mode; and transmitting respective PUCCHs to the two or more serving cells based on the two (Continued)

or more PUCCH transmit powers, wherein the two or more PUCCH transmit powers are calculated based on the first power parameters, the second power parameter and the path loss values, wherein, in the multi-connectivity mode, the UE maintains multiple connections with the two or more serving cells.

14 Claims, 16 Drawing Sheets

Related U.S. Application Data

(60) Provisional application No. 61/819,653, filed on May 6, 2013, provisional application No. 61/813,653, filed on Apr. 19, 2013.

(51) Int. Cl.
*H04W 72/04* (2009.01)
*H04W 76/02* (2009.01)
*H04L 5/00* (2006.01)
*H04W 76/15* (2018.01)

(52) U.S. Cl.
CPC ..... *H04W 72/0413* (2013.01); *H04W 76/025* (2013.01); *H04W 76/15* (2018.02)

(58) Field of Classification Search
USPC ........ 370/328, 329; 455/127.1, 452.1, 550.1, 455/522, 69
See application file for complete search history.

(56) References Cited

U.S. PATENT DOCUMENTS

| | | | |
|---|---|---|---|
| 9,078,241 | B2 | 7/2015 | Yamada |
| 9,167,492 | B2 | 10/2015 | Li |
| 9,258,750 | B2 | 2/2016 | Li et al. |
| 9,276,726 | B2 | 3/2016 | Nam et al. |
| 9,281,929 | B2 | 3/2016 | Earnshaw et al. |
| 9,301,183 | B2 | 3/2016 | Heo et al. |
| 9,509,483 | B2 * | 11/2016 | Damnjanovic ..... H04W 52/146 |
| 9,642,091 | B2 * | 5/2017 | Park .................... H04W 52/146 |
| 9,713,094 | B2 * | 7/2017 | Noh ..................... H04W 52/146 |
| 2012/0190372 | A1 | 7/2012 | Schein et al. |
| 2013/0102302 | A1 | 4/2013 | Betrencourt et al. |
| 2014/0133415 | A1 | 5/2014 | Damnjanovic et al. |
| 2015/0156768 | A1 | 6/2015 | Guan et al. |
| 2016/0066284 | A1 | 3/2016 | Kwon et al. |
| 2017/0078977 | A1 * | 3/2017 | Park .................... H04W 52/146 |
| 2017/0094612 | A1 * | 3/2017 | Dinan ................. H04W 52/365 |

FOREIGN PATENT DOCUMENTS

| | | |
|---|---|---|
| CN | 103037490 A | 4/2013 |
| CN | 103313369 A | 9/2013 |
| EP | 2563078 A1 | 2/2013 |
| KR | 10-2012-0104329 A | 9/2012 |
| WO | WO 2011/017464 A2 | 2/2011 |
| WO | WO 2011/054374 A1 | 5/2011 |

OTHER PUBLICATIONS

NTT DOCOMO, "Deployment scenarios and interference mitigation schemes for eIMTA," 3GPP TSG RAN WG1 Meeting #72, St Julian's, Malta, Jan. 28-Feb. 1, 2013, R1-130755, 8 pages.

* cited by examiner

FIG. 4
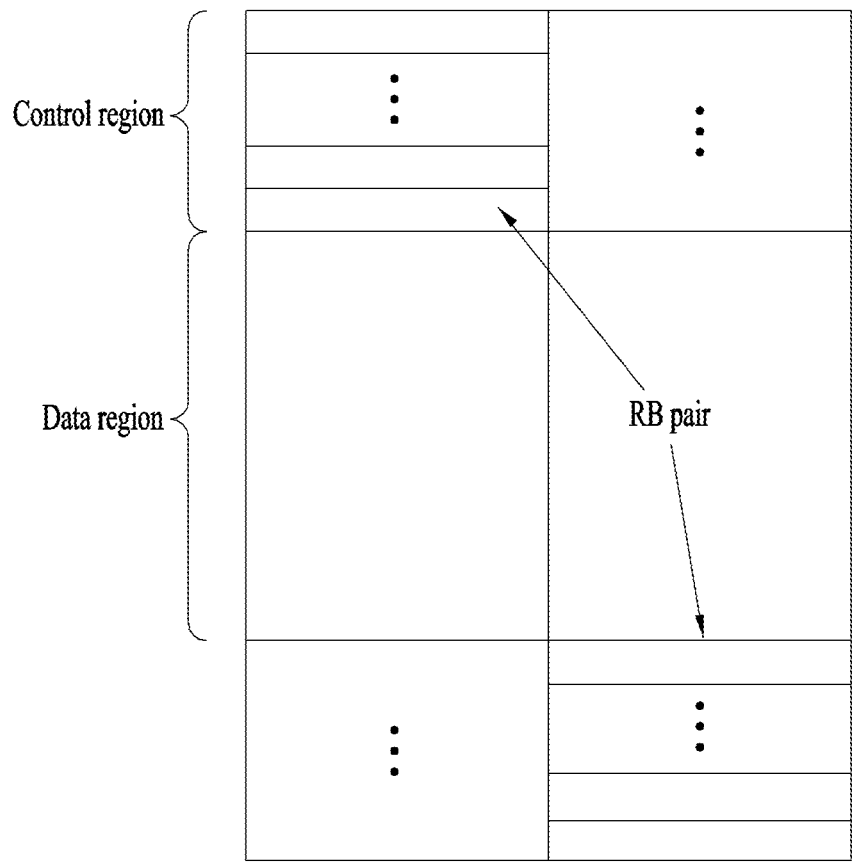
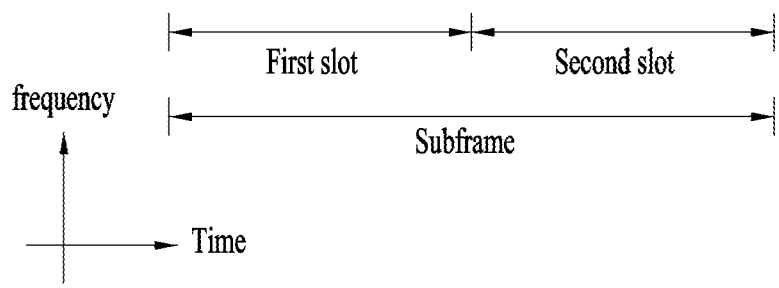

PUCCH format 1a and 1b structure (Normal CP case)

PUCCH format 1a and 1b structure (Extended CP case)

PUCCH format 2,2a and 2b structure (Normal CP case)

PUCCH format 2,2a and 2b structure (Extended CP case)

FIG. 10

Resource allocation: 18 ACK/NACK channels with normal CP $\Delta_{shift}^{PUCCH} = 2$

| Cell specific cyclic shift offset | | | RS orthogonal cover | | | ACK/NACK orthogonal cover | | |
|---|---|---|---|---|---|---|---|---|
| $\delta_{offset}^{PUCCH} = 1$ | $\delta_{offset}^{PUCCH} = 0$ | | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | | n' = 0 | | 12 | n' = 0 | | 12 |
| 2 | 1 | | | 6 | 13 | | 6 | 13 |
| 3 | 2 | | 1 | 7 | 14 | 1 | 7 | 14 |
| 4 | 3 | | | 8 | 15 | | 8 | 15 |
| 5 | 4 | | 2 | 9 | 16 | 2 | 9 | 16 |
| 6 | 5 | | | 10 | 17 | | 10 | 17 |
| 7 | 6 | | 3 | 11 | | 3 | 11 | |
| 8 | 7 | | 4 | | | 4 | | |
| 9 | 8 | | | | | | | |
| 10 | 9 | | 5 | | | 5 | | |
| 11 | 10 | | | | | | | |
| 0 | 11 | | | | | | | |

$\Delta_{shift}^{PUCCH} \in \{1,2,3\}$ for normal cyclic prefix
$\{1,2,3\}$ for extended cyclic prefix
Cell-specific Cyclic shift value of CAZAC sequence $\delta_{offset}^{PUCCH} \in \{0,1,...,\Delta_{shift}^{PUCCH} - 1\}$ Cell specific cyclic shift offset $n_{OC}$ Orthogonal sequence index for ACK/NACK
$\bar{n}_{OC}$ Orthogonal sequence index for RS
$n_{CS}$ Cyclic shift value of a CAZAC sequence used for the channelization in a RB
n' ACK/NACK resource index

POWER CONTROL METHOD AND APPARATUS IN WIRELESS ACCESS SYSTEM

CROSS-REFERENCE TO RELATED APPLICATIONS

This Application is a Continuation of co-pending U.S. patent application Ser. No. 14/782,750 filed on Oct. 6, 2015 (now U.S. Pat. No. 9,565,640 issued on Feb. 7, 2017), which is filed as the National Phase of PCT/KR2014/003461 filed on Apr. 21, 2014, which claims the benefit under 35 U.S.C. § 119(e) to U.S. Provisional Application Nos. 61/819,653 filed on May 6, 2013 and 61/813,653 filed on Apr. 19, 2013, all of which are hereby expressly incorporated by reference into the present application.

BACKGROUND OF THE INVENTION

Field of the Invention

The present invention relates to a radio access system and, more particularly, to a method for controlling transmit power in an environment, in which a user equipment (UE) is connected to two or more small cells, and an apparatus supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, the structure of a radio access system has changed to a structure in which small cells (e.g., pico cells, femto cells, etc.) having various shapes and small sizes are connected to a macro cell having a relatively large size. This aims to enable a user equipment (UE), which is an end user, to receive a high data rate to increase quality of experience in a state in which multilayered cells having vertical layers, in which conventional macro cells are fundamentally involved, are mixed.

However, in an environment in which a large number of small cells is arranged, a UE may be connected to two or more small cells to transmit and receive data. At this time, since the small cells are connected via a non-ideal backhaul, it is difficult to share data or scheduling information. At this time, the UE shall transmit control information of several small cells using a restricted uplink control channel. Accordingly, there is a need to transmit uplink control information using a method different from that of a legacy cellular system.

SUMMARY OF THE INVENTION

The present invention devised to solve the problem relates to a method for controlling uplink transmit power (e.g., PUCCH and PUCCH transmit power) in an environment, in which a user equipment (UE) is connected to two or more small cells, and an apparatus supporting the same.

An object of the present invention devised to solve the problem lies in methods for reporting power headroom of a UE.

Another object of the present invention devised to solve the problem lies in apparatuses supporting such methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention provides methods for controlling transmit power in an environment supporting a multi-connectivity mode, in which a user equipment (UE) is connected to two or more small cells, and apparatuses supporting the same.

The object of the present invention can be achieved by providing a method for controlling uplink transmit power of a user equipment (UE) in a radio access system supporting a multi-connectivity mode including the UE calculating physical uplink control channel (PUCCH) transmit power for two or more small cells in the multi-connectivity mode and the UE transmitting respective PUCCH signals to the two or more small cells based on the PUCCH transmit power. At this time, in the multi-connectivity mode, the UE may maintain multiple connections with the two or more small cells, and the two or more small cells may be connected to each other via a non-ideal backhaul link.

The method may further include receiving two or more higher layer signals including first power parameters from the two or more small cells, receiving two or more physical downlink control channel (PDCCH) signals including second power parameters from the two or more small cells, and measuring path loss values of the two or more small cells. At this time, the PUCCH transmit power may be calculated based on the first power parameters, the second power parameters and the path loss values.

In another aspect of the present invention, provided herein is a user equipment (UE) for controlling uplink transmit power in a radio access system supporting a multi-connectivity mode including a transmitter, a receiver, and a processor connected to the transmitter and the receiver to control the uplink transmit power. At this time, the processor may be configured to calculate physical uplink control channel (PUCCH) transmit power for two or more small cells in the multi-connectivity mode and control the transmitter to transmit respective PUCCH signals to the two or more small cells based on the PUCCH transmit power. In the multi-connectivity mode, the UE may maintain multiple connections with the two or more small cells, and the two or more small cells may be connected to each other via a non-ideal backhaul link.

The processor may be configured to control the receiver to receive two or more higher layer signals including first power parameters from the two or more small cells, control the receiver to receive two or more physical downlink control channel (PDCCH) signals including second power parameters from the two or more small cells, and measure path loss values of the two or more small cells. The PUCCH transmit power may be calculated based on the first power parameters, the second power parameters and the path loss values.

The PUCCH transmit power may be calculated as shown in the following equation.

$$P_{PUCCH}(i) = \min \begin{Bmatrix} P_{CMAX,c}(i), \\ P_{0\_PUCCH,c} + PL_c + h_c(n_{CQI}, n_{HARQ}, n_{SR}) + \\ \Delta_{F\_PUCCH}(F) + \Delta_{TxD}(F') + g_c(i) \end{Bmatrix}$$ [Equation]

where, $P_{CMAX,c}(i)$ denotes maximum transmit power in a subframe i of a small cell c, $P_{0\_PUCCH,c}$ denotes a sum of $P_{0\_NOMINAL\_PUCCH,c}$ which is a cell-specific parameter set with respect to the serving cell c at a higher layer and $P_{0\_UE\_PUCCH,c}$ which is a UE-specific parameter, $h_c(n_{CQI}, n_{HARQ}, n_{SR})$ denotes a parameter depending on a PUCCH format of the small cell c, $n_{CQI}$, $n_{HARQ}$, and $n_{SR}$ respectively denoting channel status information (CQI) bit number, ACK/NACK information bit number, and scheduling request (SR) information bit number, $\Delta_{F\_PUCCH}(F)$ denotes a value set at the higher layer according to a PUCCH format, $\Delta_{TxD}(F')$ denotes a value set at the higher layer to be used when the UE transmits the PUCCH signals via two antenna ports, $g_c(i)$ denotes a value acquired from a PUCCH power control command transmitted via a physical downlink control channel (PDCCH) signal, and e denotes an index of each of the two or more small cells in the multi-connectivity mode.

At this time, $P_{0\_NOMINAL\_PUCCH,c}$ may be a value commonly set with respect to the two or more small cells and $P_{0\_UE\_PUCCH,c}$ may be a value individually set with respect to the two or more small cells.

Alternatively, $P_{0\_NOMINAL\_PUCCH,c}$ may be a value individually set with respect to the two or more small cells and $P_{0\_UE\_PUCCH,c}$ may be a value commonly set with respect to the two or more small cells.

The first power parameters may include at least one of $P_{0\_NOMINAL\_PUCCH,c}$, $P_{0\_UE\_PUCCH,c}$, $\Delta_{F\_PUCCH}(F)$ and $\Delta_{TxD}(F')$, and the second power parameters may include $g_c(i)$, $\delta_{PUCCH}$ and a parameter indicating a PUCCH format.

It is to be understood that both the foregoing general description and the following detailed description of the present invention are exemplary and explanatory and are intended to provide further explanation of the invention as claimed.

As is apparent from the above description, the embodiments of the present invention have the following effects.

First, it is possible to efficiently save power in a multi-connectivity mode in which a user equipment (UE) is connected to two or more small cells.

Second, a UE reports a power headroom value thereof to an eNB, such that the eNB can efficiently control transmit power of the UE.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

BRIEF DESCRIPTION OF THE DRAWINGS

The accompanying drawings, which are included to provide a further understanding of the invention, illustrate embodiments of the invention and together with the description serve to explain the principle of the invention.

FIG. 4 is a diagram illustrating a structure of an uplink subframe according to the embodiments.

FIG. 10 illustrates ACK/NACK channelization for PUCCH formats 1a and 1b.

DETAILED DESCRIPTION OF THE EMBODIMENTS

Figure 1:
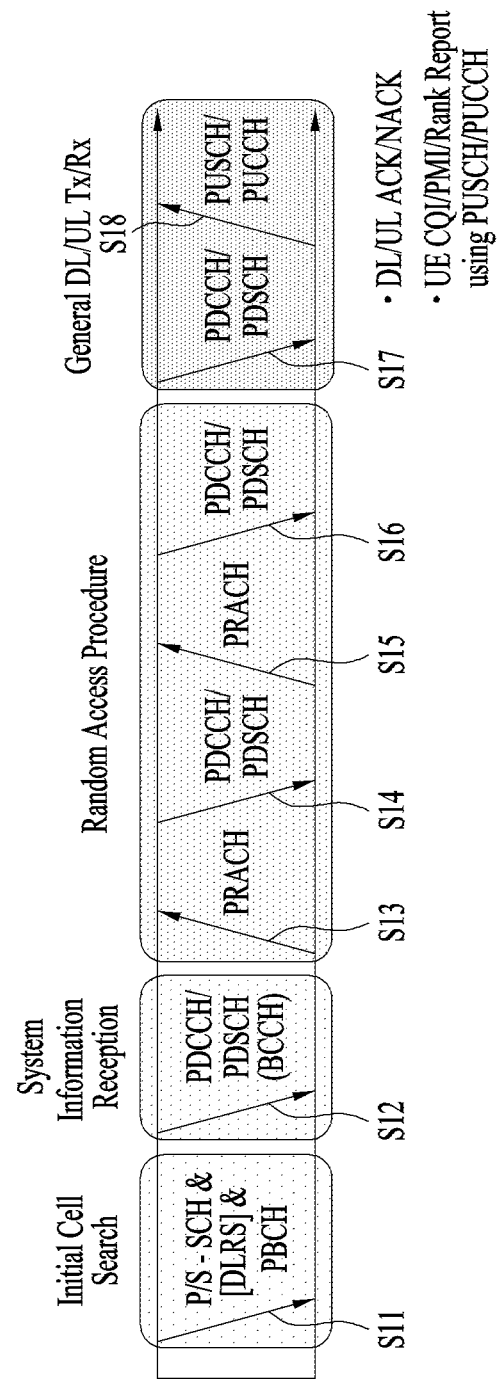
FIG. 1 is a conceptual diagram illustrating physical channels used in the embodiments and a signal transmission method using the physical channels.

The following embodiments of the present invention provide methods for controlling transmit power and transmitting channel status information (CSI) in an environment supporting a multi-connectivity mode, in which a user equipment (UE) is connected to two or more small cells, and apparatuses supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
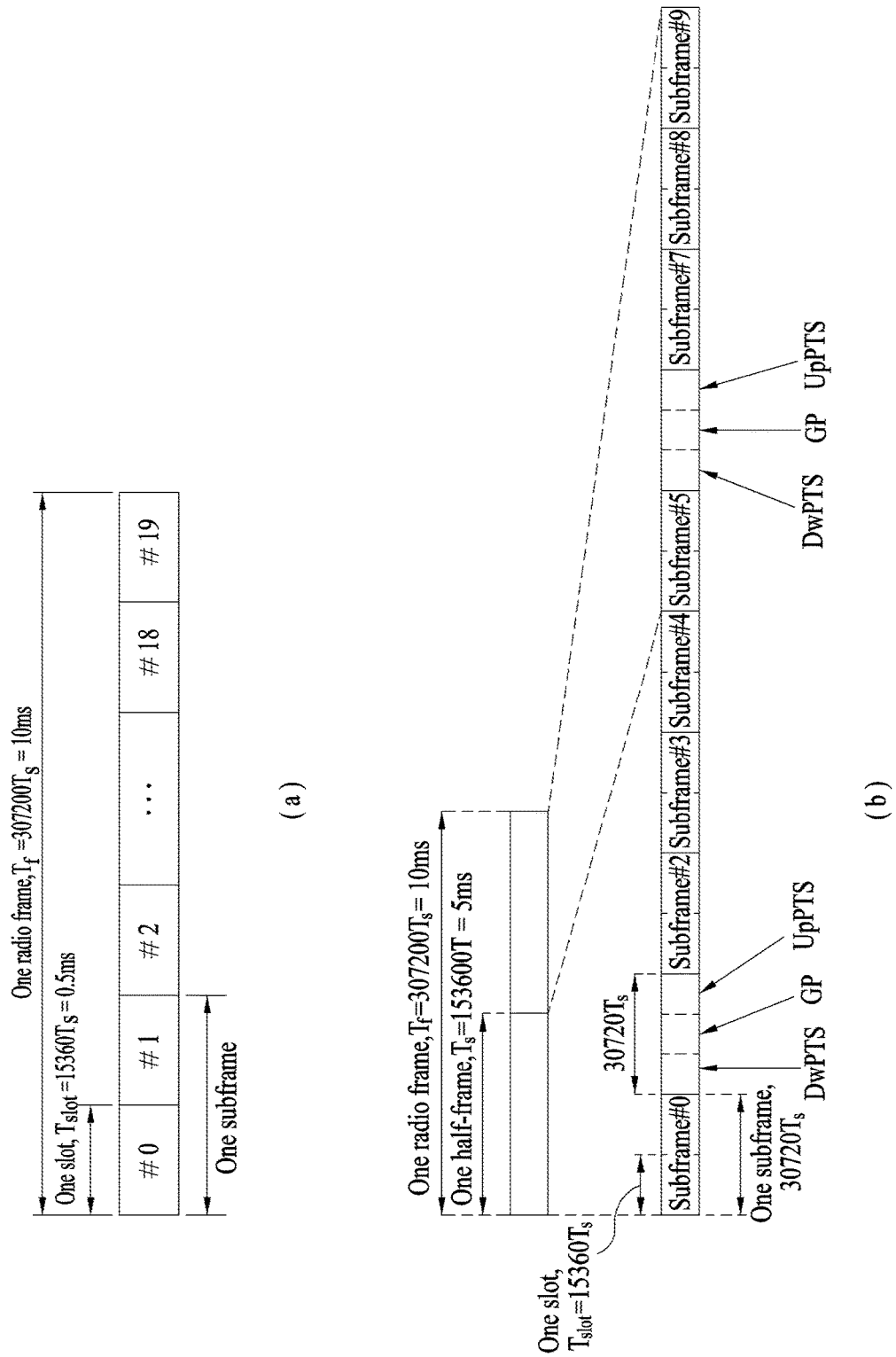
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×$10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s$=1/(15 kHz×2048)=3.2552×$10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL FIG. 3 illustrates an exemplary structure of a DL resource grid for the duration of one DL slot, which may be used in embodiments of the present disclosure.

Figure 3:
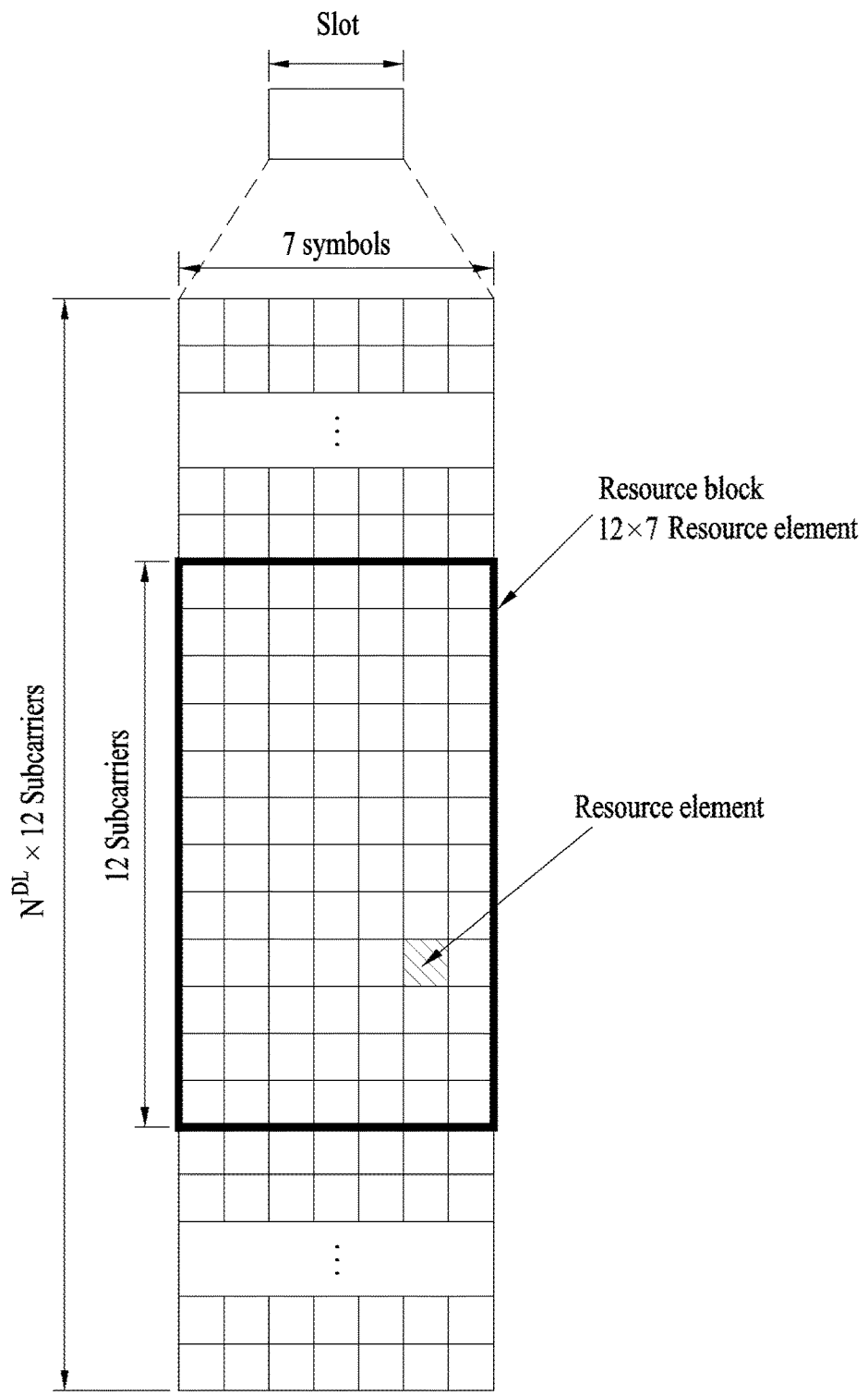
FIG. 3 is a diagram illustrating an example of a resource grid of a downlink slot according to the embodiments.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
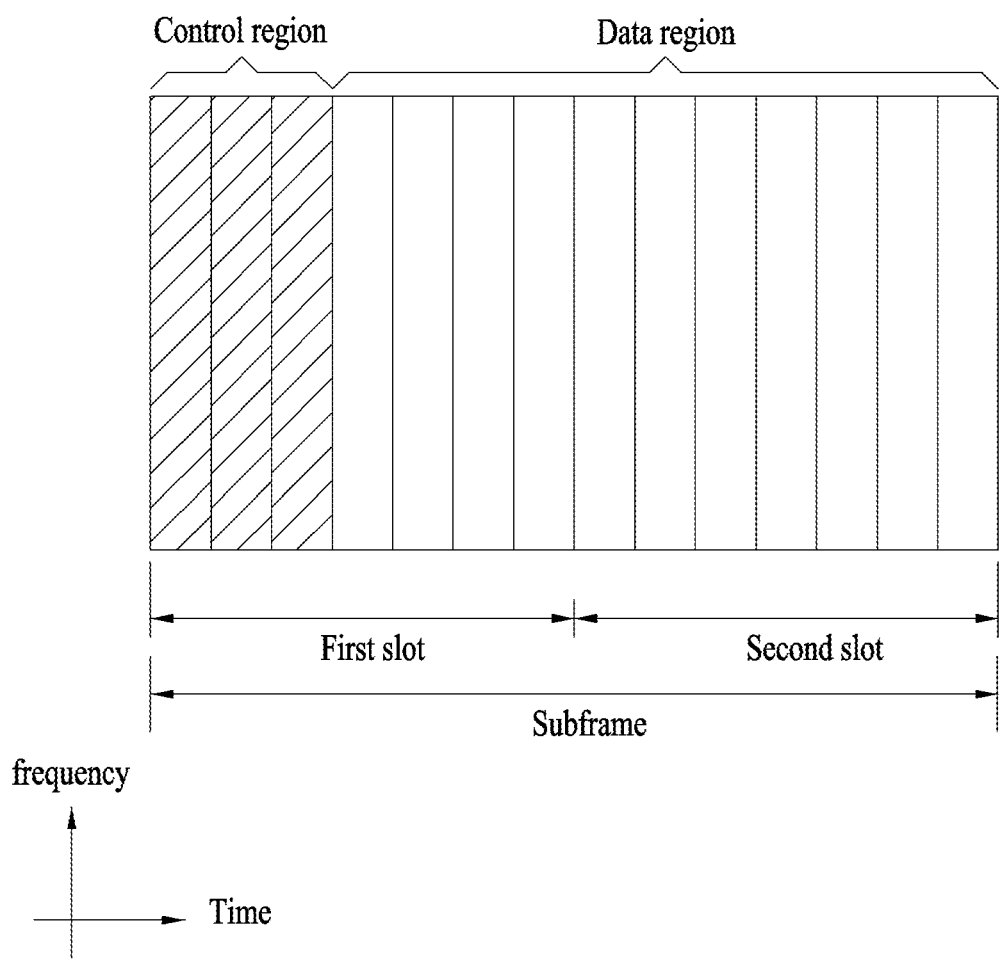
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/ broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);
(2) Transmission mode 2: Transmit diversity;
(3) Transmission mode 3: Open-loop spatial multiplexing when the number of layer is larger than 1 or Transmit diversity when the rank is 1;
(4) Transmission mode 4: Closed-loop spatial multiplexing;
(5) Transmission mode 5: MU-MIMO;
(6) Transmission mode 6: Closed-loop rank-1 precoding;
(7) Transmission mode 7: Precoding supporting a single layer transmission, which does not based on a codebook (Rel-8);
(8) Transmission mode 8: Precoding supporting up to two layers, which do not based on a codebook (Rel-9);
(9) Transmission mode 9: Precoding supporting up to eight layers, which do not based on a codebook (Rel-10); and
(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level L $\in\{1,2,4,8\}$. The CCEs of PDCCH candidate set m in the SS may be determined by the following equation.

$$L \cdot \{(Y_k+m) \bmod \lfloor N_{CCE,k}/L \rfloor\}+i \quad \text{[Equation 1]}$$

where $M^{(L)}$ is the number of PDCCH candidates with CCE aggregation level L to be monitored in the SS, m=0, . . . , $M^{(L)}$−1, i is the index of a CCE in each PDCCH candidate, and i=0, . . . , L−1. k=$\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| | Search space $S_k^{(L)}$ | | Number of PDCCH |
|---|---|---|---|
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k=(A \cdot Y_{k-1}) \bmod D \quad \text{[Equation 2]}$$

where $Y_{-1}=n_{RNTI} \neq 0$, $n_{RNTI}$ indicating an RNTI value. A=39827 and D=65537.

1.3. PUCCH (Physical Uplink Control Channel)

PUCCH may include the following formats to transmit control information.

(1) Format 1: On-Off keying (OOK) modulation, used for SR (Scheduling Request)

(2) Format 1a & 1b: Used for ACK/NACK transmission
 1) Format 1a: BPSK ACK/NACK for 1 codeword
 2) Format 1b: QPSK ACK/NACK for 2 codewords (3) Format 2: QPSK modulation, used for CQI transmission (4) Format 2a & Format 2b: Used for simultaneous transmission of CQI and ACK/NACK (5) Format 3: Used for multiple ACK/NACK transmission in a carrier aggregation environment Table 6 shows a modulation scheme according to PUCCH format and the number of bits per subframe. Table 7 shows the number of reference signals (RS) per slot according to PUCCH format. Table 8 shows SC-FDMA symbol location of RS (reference signal) according to PUCCH format. In Table 6, PUCCH format 2a and PUCCH format 2b correspond to a case of normal cyclic prefix (CP).

TABLE 6

| PUCCH format | Modulation scheme | No. of bits per subframe, Mbit |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |
| 3 | QPSK | 48 |

TABLE 7

| PUCCH format | Normal CP | Extended CP |
|---|---|---|
| 1, 1a, 1b | 3 | 2 |
| 2, 3 | 2 | 1 |
| 2a, 2b | 2 | N/A |

TABLE 8

| | SC-FDMA symbol location of RS | |
|---|---|---|
| PUCCH format | Normal CP | Extended CP |
| 1, 1a, 1b | 2, 3, 4 | 2, 3 |
| 2, 3 | 1, 5 | 3 |
| 2a, 2b | 1, 5 | N/A |

Figure 6:
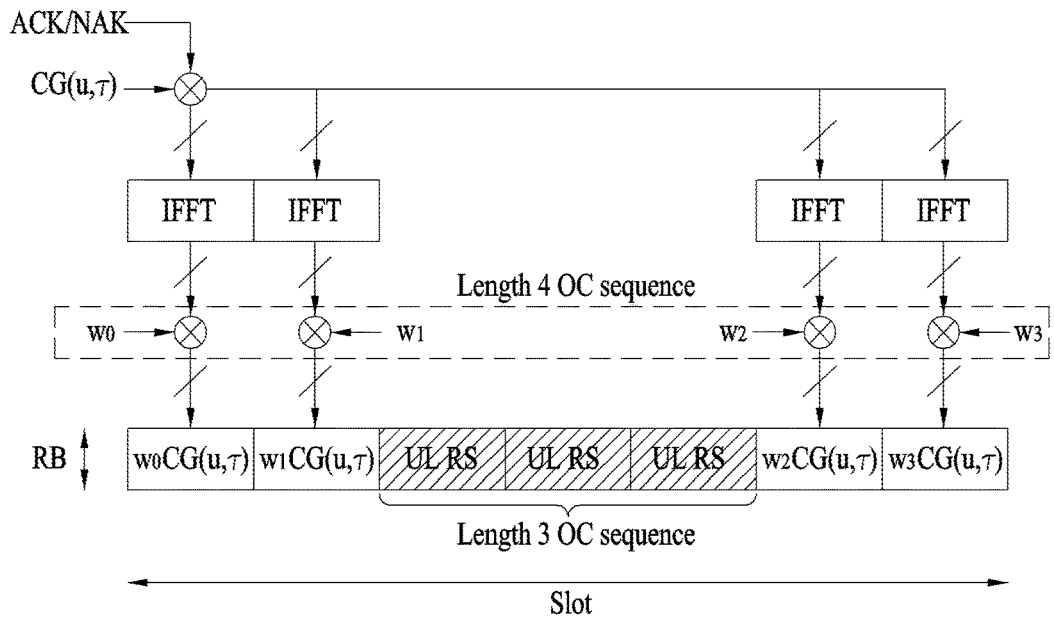
FIG. 6 illustrates PUCCH formats 1a and 1b for use in a normal cyclic prefix (CP) case and FIG. 7 illustrates PUCCH formats 1a and 1b for use in an extended CP case.
Figure 7:
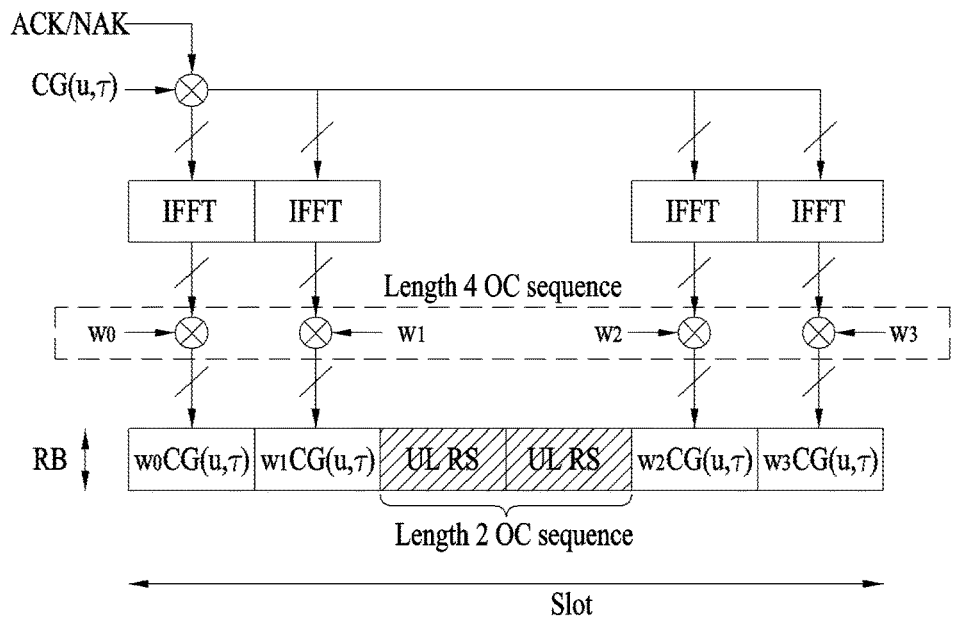

FIG. 6 shows PUCCH formats 1a and 1b in case of a normal cyclic prefix. And, FIG. 7 shows PUCCH formats 1a and 1b in case of an extended cyclic prefix.

According to the PUCCH formats 1a and 1b, control information of the same content is repeated in a subframe by slot unit. In each user equipment, ACK/NACK signal is transmitted on a different resource constructed with a different cyclic shift (CS) (frequency domain code) and an orthogonal cover (OC) or orthogonal cover code (OCC) (time domain spreading code) of CG-CAZAC (computergenerated constant amplitude zero auto correlation) sequence. For instance, the OC includes Walsh/DFT orthogonal code. If the number of CS and the number of OC are 6 and 3, respectively, total 18 user equipments may be multiplexed within the same PRB (physical resource block) with reference to a single antenna. Orthogonal sequences w0, w1, w2 and w3 may be applicable to a random time domain (after FFT modulation) or a random frequency domain (before FFT modulation).

For persistent scheduling with SR, ACK/NACK resource constructed with CS, OC and PRB (physical resource block) may be allocated to a user equipment through RRC (radio resource control. For non-persistent scheduling with dynamic ACK/NACK, the ACK/NACK resource may be implicitly allocated to a user equipment using a smallest CCE index of PDCCH corresponding to PDSCH.

Length-4 orthogonal sequence (OC) and length-3 orthogonal sequence for PUCCH format 1/1a/1b are shown in Table 9 and Table 10, respectively.

TABLE 9

| Sequence index $n_{oc}$ ($n_s$) | Orthogonal sequences [w(0) ... w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 10

| Sequence index $n_{oc}$ ($n_s$) | Orthogonal sequences [w(0) ... w($N_{SF}^{PUCCH}$ − 1)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequence (OC)) [$\overline{w}(0)$ ... $\overline{w}(N_{RS}^{PUCCH}-1)$] for a reference signal in
PUCCH format 1/1a/1b is shown in Table 11.

TABLE 11

| Sequence index $\overline{n}_{oc}(n_s)$ | Normal cyclic prefix | Extended cyclic prefix |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

Figure 8:
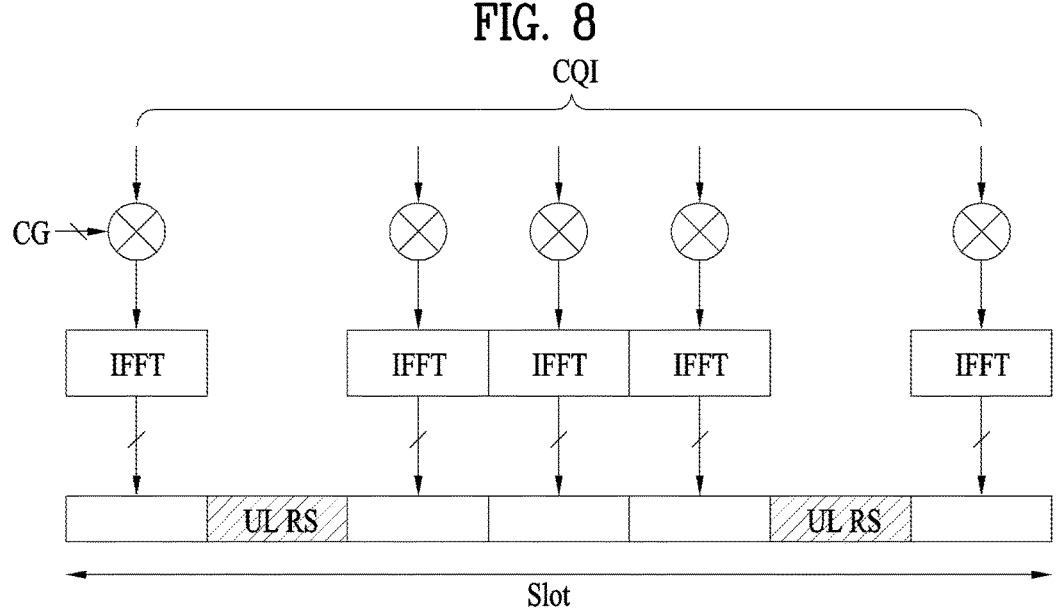
FIG. 8 illustrates PUCCH formats 2/2a/2b in a normal cyclic prefix (CP) case.

FIG. 8 shows PUCCH format 2/2a/2b in case of a normal cyclic prefix. And, FIG. 9 shows PUCCH format 2/2a/2b in case of an extended cyclic prefix.

Figure 9:
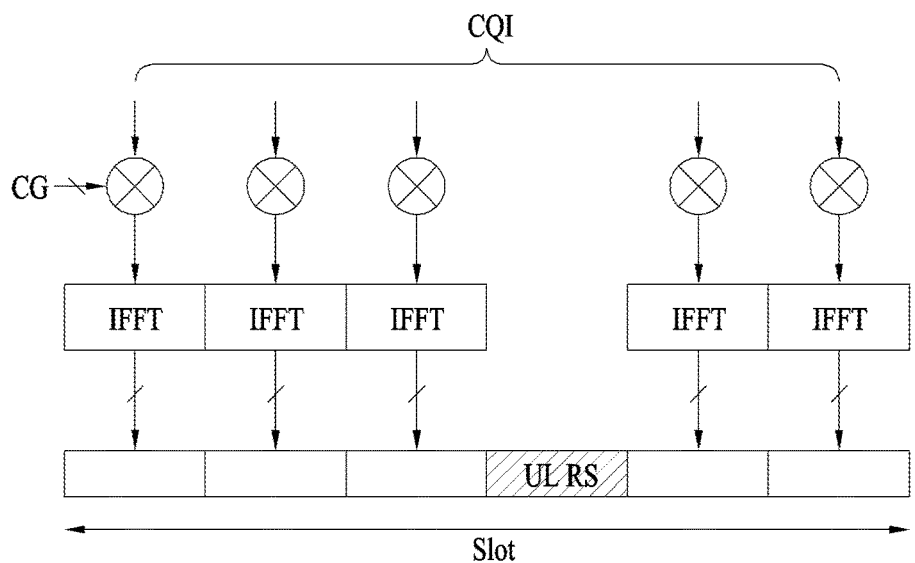
FIG. 9 illustrates PUCCH formats 2/2a/2b in an extended CP case.

Referring to FIG. 8 and FIG. 9, in case of a normal CP, a subframe is constructed with 10 QPSK data symbols as well as RS symbol. Each QPSK symbol is spread in a frequency domain by CS and is then mapped to a corresponding SC-FDMA symbol. SC-FDMA symbol level CS hopping may be applied to randomize inter-cell interference. The RS may be multiplexed by CDM using a cyclic shift. For instance, assuming that the number of available CSs is 12, 12 user equipments may be multiplexed in the same PRB. For instance, assuming that the number of available CSs is 6, 6 user equipments may be multiplexed in the same PRB. In brief, a plurality of user equipments in PUCCH format 1/1a/1b and PUCCH format 2/2a/2b may be multiplexed by 'CS+OC+PRB' and 'CS+PRB', respectively.

FIG. 10 is a diagram of ACK/NACK channelization for PUCCH formats 1a and 1b. In particular, FIG. 10 corresponds to a case of '$\Delta_{shift}^{PUCCH}=2$'.

Figure 11:
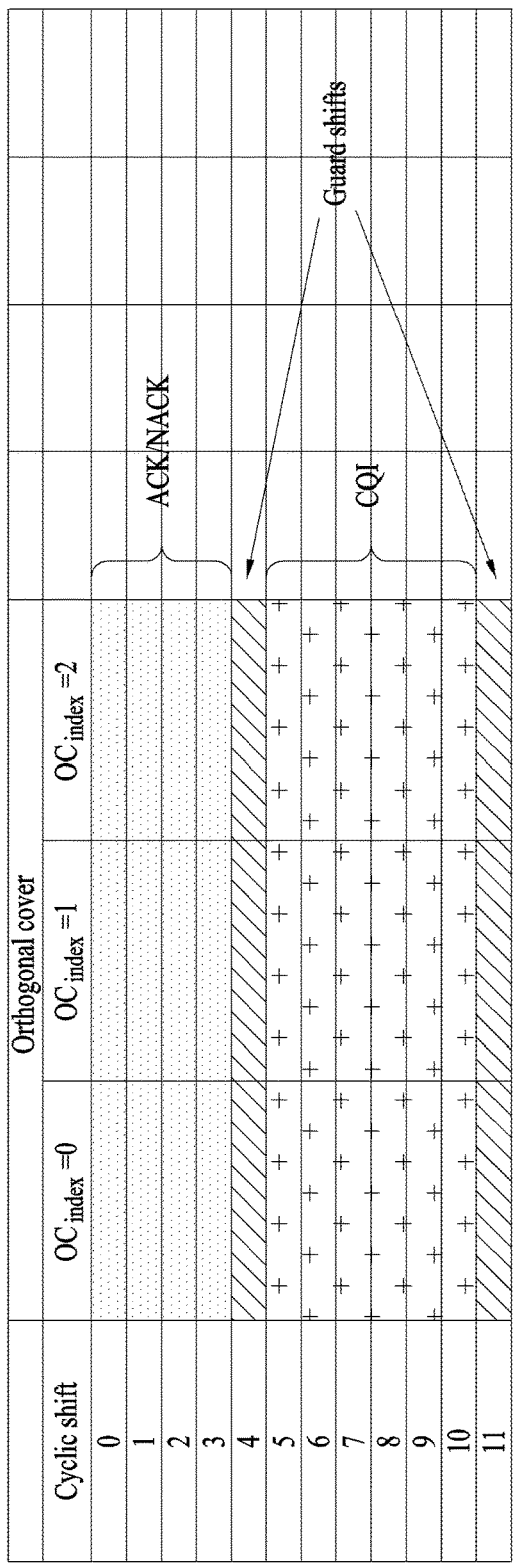
FIG. 11 illustrates channelization for a hybrid structure of PUCCH format 1a/1b and format 2/2a/2b in the same PRB.

FIG. 11 is a diagram of channelization for a hybrid structure of PUCCH format 1/1a/1b and PUCCH format 2/2a/2b.

Cyclic shift (CS) hopping and orthogonal cover (OC) remapping may be applicable in a following manner.

(1) Symbol-based cell-specific CS hopping for randomization of inter-cell interference (2) Slot level CS/OC remapping 1) For inter-cell interference randomization 2) Slot based access for mapping between ACK/NACK channel and resource (k)

Meanwhile, resource $n_r$ for PUCCH format 1/1a/1 b may include the following combinations.

(1) CS (=equal to DFT orthogonal code at symbol level) ($n_{cs}$)

(2) OC (orthogonal cover at slot level) ($n_{oc}$)

(3) Frequency RB (Resource Block) ($n_{rb}$)

If indexes indicating CS, OC and RB are set to $n_{cs}$, $n_{oc}$, $n_{rb}$, respectively, a representative index $n_r$ may include $n_{cs}$, $n_{oc}$, and $n_{rb}$. In this case, the $n_r$ may meet the condition of '$n_r=(n_{cs}, n_{oc}, n_{rb})$'.

The combination of CQI, PMI, RI, CQI and ACK/NACK may be delivered through the PUCCH format 2/2a/2b. And, Reed Muller (RM) channel coding may be applicable.

For instance, channel coding for UL (uplink) CQI in LTE system may be described as follows. First of all, bitstreams $a_0$, $a_1$, $a_2$, $a_3$, ..., $a_{A-1}$ may be coded using (20, A) RM code. In this case, $a_0$ and $a_{A-1}$ indicates MSB (Most Significant Bit) and LSB (Least Significant Bit), respectively. In case of an extended cyclic prefix, maximum information bits include 11 bits except a case that QI and ACK/NACK are simultaneously transmitted. After coding has been performed with 20 bits using the RM code, QPSK modulation may be applied. Before the BPSK modulation, coded bits may be scrambled.

Table 12 shows a basic sequence for (20, A) code.

TABLE 12

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 1 | 1 | 0 | 1 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |

TABLE 12-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$, may be generated by Formula 1.

$$b_i = \sum_{n=0}^{A-1} (a_n \cdot M_{i,n}) \bmod 2 \quad \text{[Formula 3]}$$

In Formula 3, 'i=0, 1, 2, . . . , B−1' is met.

In case of wideband repots, a bandwidth of UCI (uplink control information) field for CQI/PMI can be represented as Tables 8 to 10 in the following.

Table 13 shows UCI (Uplink Control Information) field for broadband report (single antenna port, transmit diversity) or open loop spatial multiplexing PDSCH CQI feedback.

TABLE 13

| Field | Bandwidth |
|---|---|
| Broadband CQI | 4 |

Table 14 shows UL control information (UCI) field for CQI and PMI feedback in case of wideband reports (closed loop spatial multiplexing PDSCH transmission).

TABLE 14

| | Bandwidth | | | |
|---|---|---|---|---|
| | 2 antenna ports | | 4 antenna ports | |
| Field | rank = 1 | rank = 2 | rank = 1 | Rank >1 |
| Wideband CQI | 4 | 4 | 4 | 4 |
| Spatial differential CQI | 0 | 3 | 0 | 3 |
| Precoding Matrix Indication | 2 | 1 | 4 | 4 |

Table 15 shows UL control information (UCI) field for RI feedback in case of wideband reports.

TABLE 15

| | Bit widths | | |
|---|---|---|---|
| | | 4 antenna ports | |
| Field | 2 antenna ports | Max. 2 layers | Max. 4 layers |
| Rank Indication | 1 | 1 | 2 |

Figure 12:
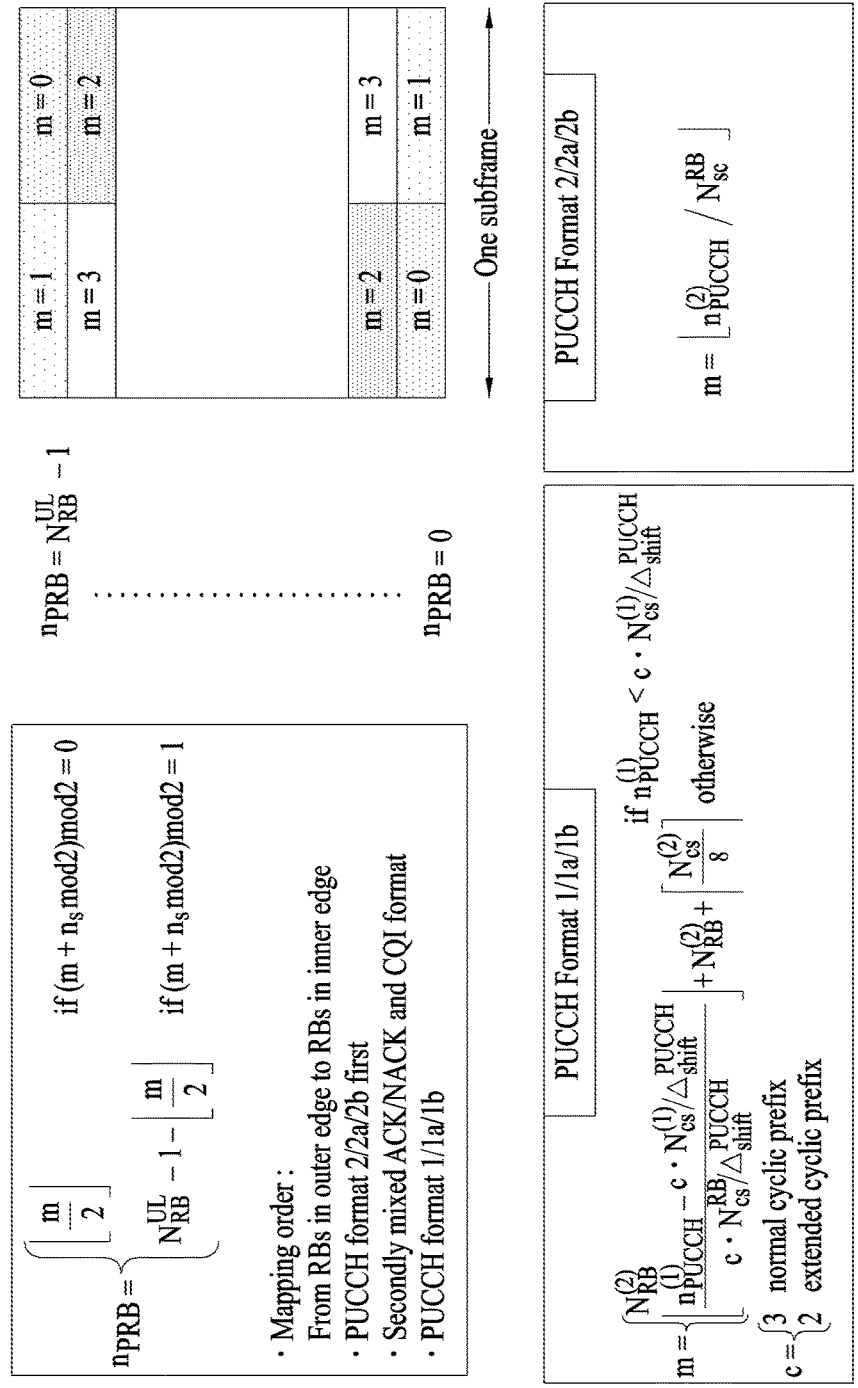
FIG. 12 illustrates allocation of a physical resource block (PRB).

FIG. 12 is a diagram for PRB allocation. Referring to FIG. 20, PRB may be usable for PUCCH transmission in a slot $n_s$.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 13:
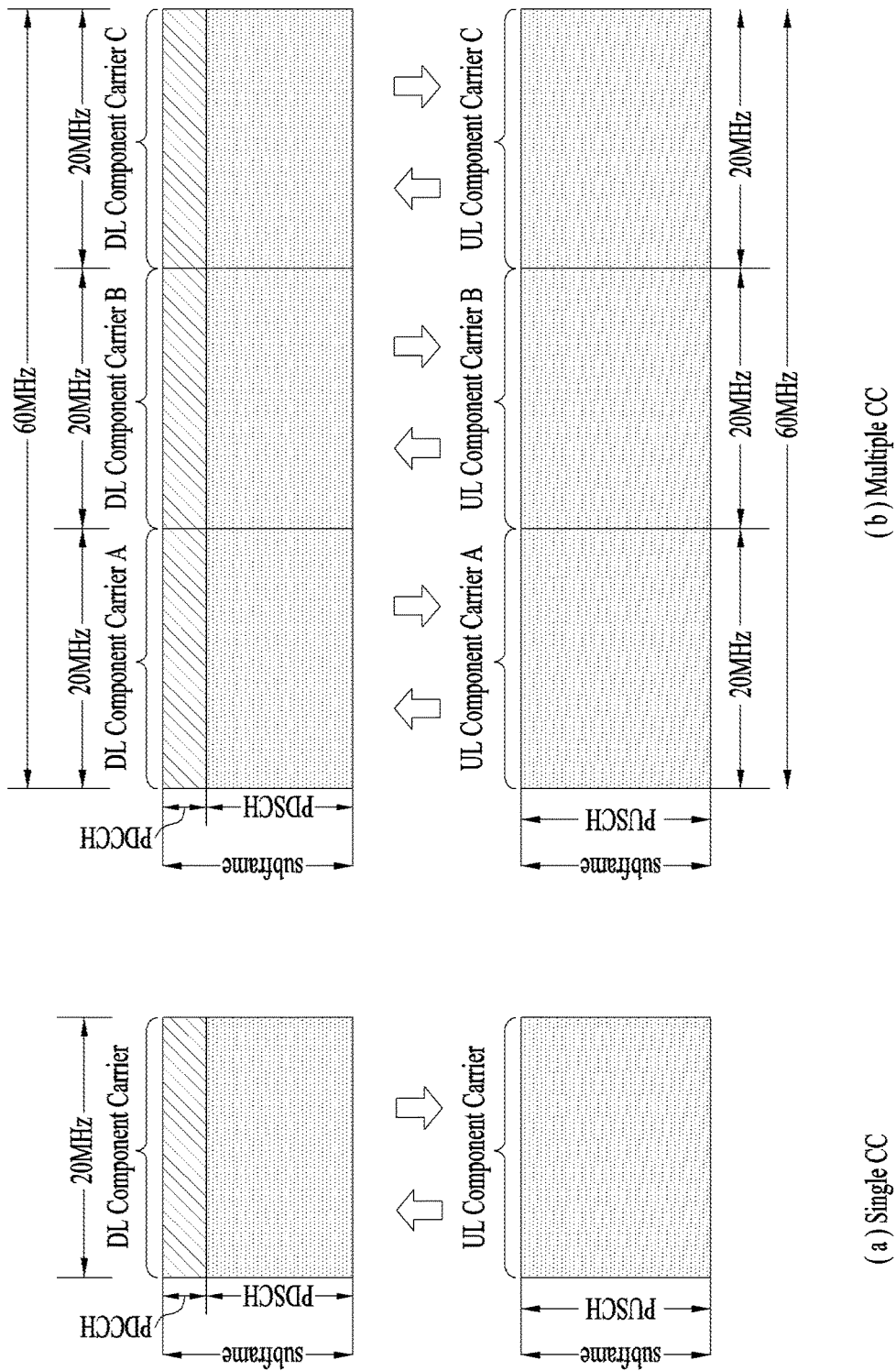
FIG. 13 is a diagram illustrating an example of a component carrier (CC) of the embodiments and carrier aggregation (CA) used in an LTE_A system.

FIG. 13 illustrates an example of CCs and CA in the LTE-A system, which are used in embodiments of the present disclosure.

FIG. 13(a) illustrates a single carrier structure in the LTE system. There are a DL CC and a UL CC and one CC may have a frequency range of 20 MHz.

FIG. 13(b) illustrates a CA structure in the LTE-A system. In the illustrated case of FIG. 13(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 14:
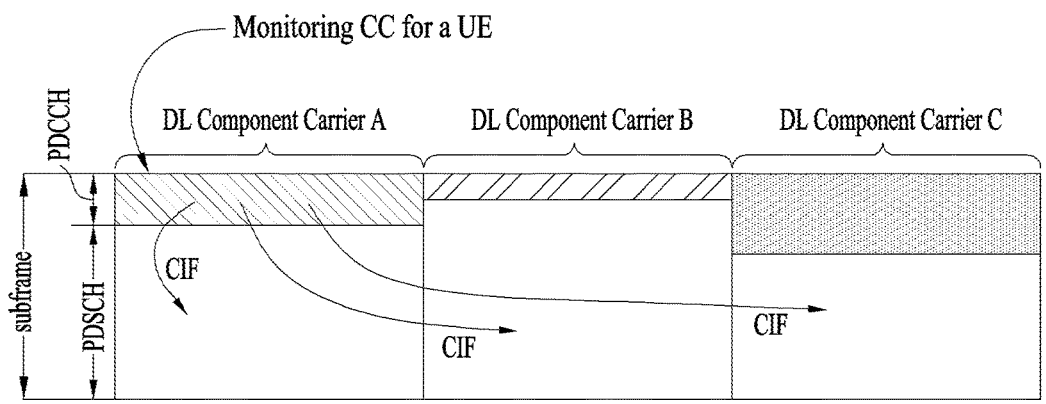
FIG. 14 illustrates a subframe structure of an LTE-A system according to cross-carrier scheduling.

FIG. 14 illustrates a cross carrier-scheduled subframe structure in the LTE-A system, which is used in embodiments of the present disclosure.

Referring to FIG. 14, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 15:
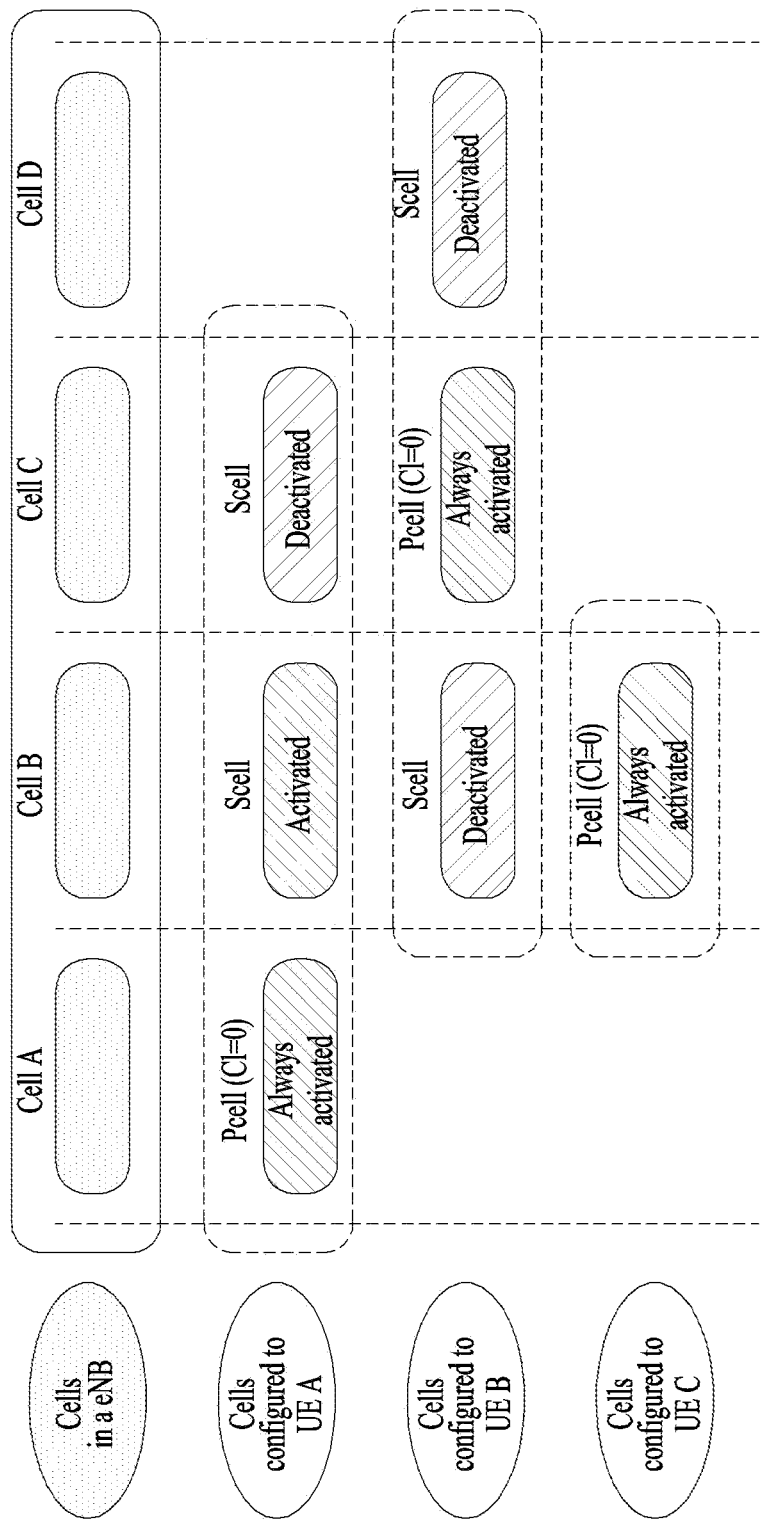
FIG. 15 is conceptual diagram illustrating a construction of serving cells according to cross-carrier scheduling.

FIG. 15 is conceptual diagram illustrating a construction of serving cells according to cross-carrier scheduling.

Referring to FIG. 15, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 15 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

2.3 CA PUCCH (Carrier Aggregation Physical Uplink Control Channel)

In a wireless communication system supportive of carrier aggregation, PUCCH format for feeding back UCI (e.g., multi-ACK/NACK bit) can be defined. For clarity of the following description, such PUCCH format shall be named CA PUCCH format.

Figure 16:
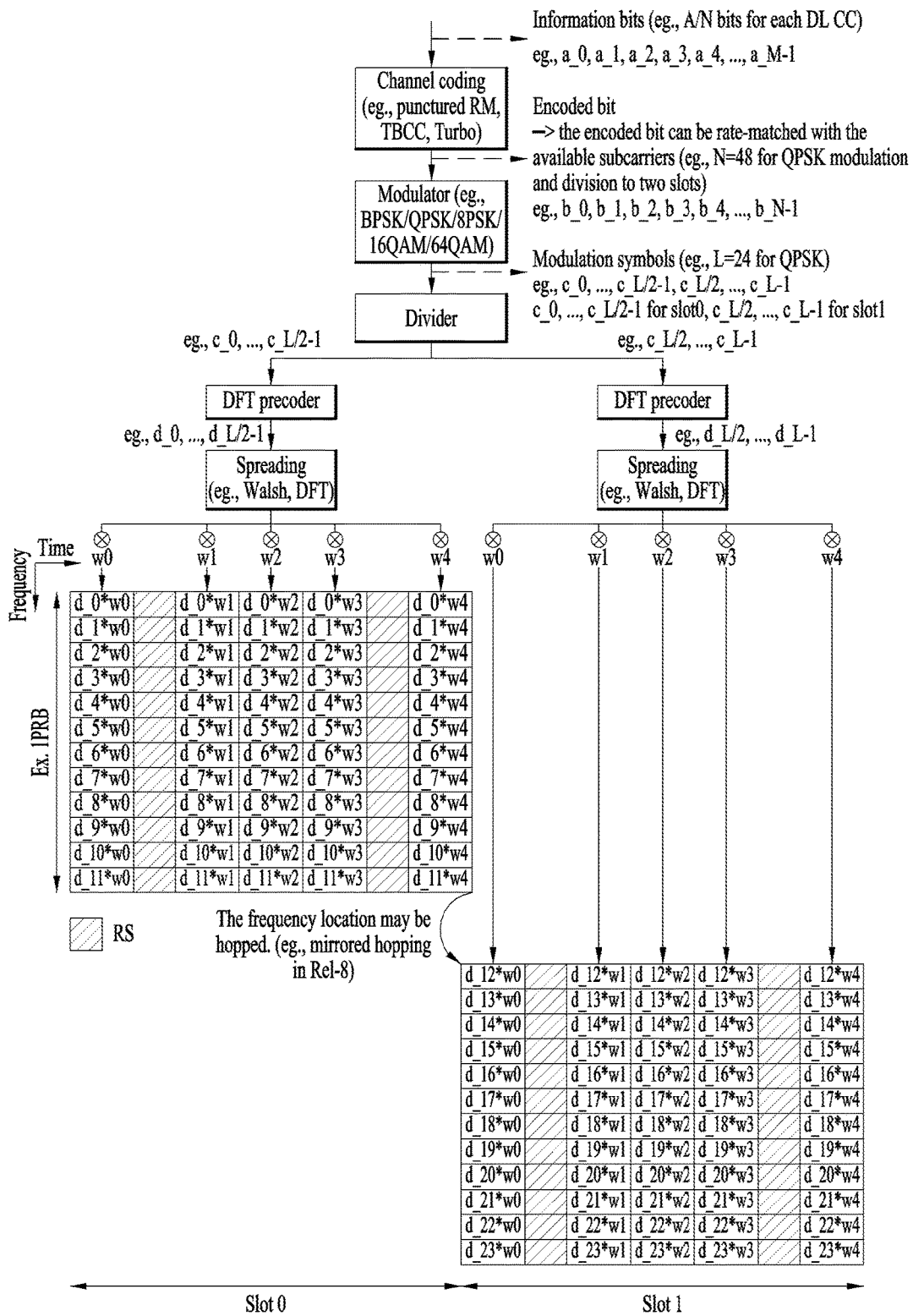
FIG. 16 is a conceptual diagram illustrating CA PUCCH signal processing.

FIG. 16 is a diagram for one example of a signal processing process of CA PUCCH.

Referring to FIG. 16, a channel coding block generates coding bits (e.g., encoded bits, coded bits, etc.) (or codeword) $b\_0, b\_1, \ldots$ and $b\_N-1$ by channel-coding information bits $a\_0, a\_1, \ldots$ and $a\_M-1$ (e.g., multiple ACK/NACK bits). In this case, the M indicates a size of information bits and the N indicates a size of the coding bits. The information bits may include multiple ACK/NACK for UL control information (UCI), e.g., a plurality of data (or PDSCH) received via a plurality of DL CCS. In this case, the information bits $a\_0, a\_1, \ldots a\_M-1$ may be joint-coded irrespective of type/number/size of the UCI configuring the information bits. For instance, in case that information bits include multiple ACK/NACK for a plurality of DL CCs, channel coding may not be performed per DL CC or individual ACK/NACK bit but may be performed on all bit information, from which a single codeword may be generated. And, channel coding is non-limited by this. Moreover, the channel coding may include one of simplex repetition, simplex coding, RM (Reed Muller) coding, punctured RM coding, TBCC (tail-biting convolutional coding), LDPC (low-density parity-check), turbo coding and the like. Besides, coding bits may be rate-matched in consideration of a modulation order and a resource size (not shown in the drawing). A rate matching function may be included as a part of the channel coding block or may be performed via a separate function block.

A modulator generates modulated symbols $c\_0, c\_1, \ldots c\_L-1$ by modulating coding bits $b\_0, b\_1 \ldots b\_N-1$. In this case, the L indicates a size of modulated symbol. This modulation scheme may be performed in a manner of modifying a size and phase of a transmission signal. For instance, the modulation scheme may include one of n-PSK (Phase Shift Keying), n-QAM (Quadrature Amplitude Modulation) and the like, where n is an integer equal to or greater than 2. In particular, the modulation scheme may include one of BPSK (Binary PSK), QPSK (Quadrature PSK), 8-PSK, QAM, 16-QAM, 64-QAM and the like.

A divider divides the modulated symbols $c\_0, c\_1 \ldots c\_L-1$ to slots, respectively. A sequence/pattern/scheme for dividing the modulated symbols to the slots may be specially non-limited. For instance, the divider may be able to divide the modulated symbols to the corresponding slots in order from a head to tail (Localized scheme). In doing so, as shown in the drawing, the modulated symbols $c\_0, c\_1 \ldots c\_L/2-1$ may be divided to the slot 0 and the modulated symbols $c\_L/2, c\_L/2+1 \ldots c\_L-1$ may be divided to the slot 1. Moreover, the modulated symbols may be divided to the corresponding slots, respectively, by interleaving or permutation. For instance, the even-numbered modulated symbol may be divided to the slot 0, while the odd-numbered modulated symbol may be divided to the slot 1. The modulation scheme and the dividing scheme may be switched to each other in order.

A DFT precoder may perform DFT precoding (e.g., 12-point DFT) on the modulated symbols divided to the corresponding slots to generate a single carrier waveform. Referring to the drawing, the modulated symbols $c\_0$, $c\_1 \ldots c\_L/2-1$ divided to the corresponding slot 0 may be DFT-precoded into DFT symbols $d\_0, d\_1 \ldots d\_L/2-1$, and the modulated symbols $c\_L/2, c\_L/2+1 \ldots c\_L-1$ divided to the slot 1 may be DFT-precoded into DFT symbols $d\_L/2$, $d\_L/2+1 \ldots d\_L-1$. Moreover, the DFT precoding may be replaced by another linear operation (e.g., Walsh precoding) corresponding thereto.

A spreading block may spread the DFT-performed signal at SC-FDMA symbols level (e.g., time domain). The time-domain spreading at the SC-FDMA level may be performed using a spreading code (sequence). The spreading code may include pseudo orthogonal code and orthogonal code. The pseudo orthogonal code may include PN (pseudo noise) code, by which the pseudo orthogonal code may be non-limited. The orthogonal code may include Walsh code and DFT code, by which the orthogonal code may be non-limited. The orthogonal code (OC) may be interchangeably used with one of an orthogonal sequence, an orthogonal cover (OC) and an orthogonal cover code (OCC). In this specification, for example, the orthogonal code may be mainly described as a representative example of the spreading code for clarity and convenience of the following description. Optionally, the orthogonal code may be substituted with the pseudo orthogonal code. A maximum value of a spreading code size (or a spreading factor: SF) may be limited by the number of SC-FDAM symbols used for control information transmission. For example, in case that 5 SC-FDMA symbols are used in one slot for control information transmission, orthogonal codes (or pseudo orthogonal codes) w0, w1, w2, w3 and w4 of length 5 may be used per slot. The SF may mean a spreading degree of the control information and may be associated with a multiplexing order or an antenna multiplexing order of a user equipment. The SF may be variable like 1, 2, 3, 4, 5 . . . depending on a requirement of a system. The SF may be defined in advance between a base station and a user equipment. And, the SF may be notified to a user equipment via DCI or RRC signaling.

The signal generated through the above-described process may be mapped to subcarrier within the PRB and may be then transformed into a time-domain signal through IFFT. CP may be attached to the time-domain signal. The generated SC-FDMA symbol may be then transmitted through an RF stage.

3. CSI Reporting Method in Small Cell Environment 3.1 Small Cell Environment

The term "cell" described in the embodiments of the present invention may fundamentally include downlink resources and optionally include uplink resources (see Chapter 2.1). At this time, linkage between carrier frequency for downlink resources and carrier frequency for uplink resources is specified in system information (SI) delivered via downlink resources.

In addition, the term "cell" means a specific frequency region or a specific geographical region as coverage of an eNB. The term "cell may have the same meaning as the eNB supporting specific coverage, for convenience of description. For example, a macro eNB and a macro cell may be used as the same meaning and a small base station and a small cell may be used as the same meaning. The terms cell and base station may have respective original meanings upon being explicitly distinguished.

In a next-generation wireless communication system, in order to more stably secure a data service such as multimedia, interest in introduction of a hierarchical cell structure in which a micro cell, a pico cell and/or a femto cell, all of which are small cells for low-power/short-range communication, are mixed or a heterogeneous cell structure to a homogeneous network based on a macro cell has increased. This is because additional installation of a macro cell in an existing eNB can improve system performance but is not efficient in terms of cost and complexity.

Assume that the term "cell" applied to the following embodiments refers to a small cell unless stated otherwise. However, the present invention is applicable to a cell (e.g., a macro cell) used in a general cellular system.

In addition, the technologies described in Chapters 1 to 3 are applicable to the following embodiments of the present invention.

3.2 Multi-Connectivity Mode

In the embodiments of the present invention, a new connectivity mode is proposed. That is, a multi-connectivity mode in which a UE is simultaneously connected to two or more cells is proposed. The UE may be simultaneously connected to a plurality of cells having the same downlink carrier frequency or different downlink carrier frequencies in the multi-connectivity mode. The multi-connectivity mode may be referred to as a multi-connection mode, a new connectivity mode or a new connection mode as the connection mode newly proposed in the embodiments of the present invention.

The multi-connectivity mode means that the UE may be simultaneously connected to a plurality of cells. Hereinafter, for convenience of description, assume that the UE is connected to two cells. The present invention is equally applicable to the case in which the UE is connected to three or more cells.

For example, the UE may simultaneously receive services from a first cell and a second cell. At this time, the UE may receive functionalities (e.g., connection management, mobility management) provided by a control plane (C-plane) via the first cell and the second cell.

In addition, the UE may perform carrier aggregation (CA) with two or more cells. For example, the first cell may use n (n being an arbitrary positive integer) arbitrary carriers and the second cell may use k (k being an arbitrary positive integer) arbitrary carriers. At this time, the carriers of the first cell and the second cell are the same frequency carriers or different frequency carriers. For example, the first cell may use F1 and F2 frequency bands and the second cell may use F2 and F3 frequency bands.

A plurality of cells may physically exist in the same position or different positions. At this time, assume that the plurality of cells is connected to each other via a backhaul but the backhaul is a non-ideal backhaul via which it is difficult to share scheduling information or data of a specific UE due to very large transmission delay.

In the embodiments of the present invention, assume that the cell is a small cell. For example, as an environment in which the small cell is arranged, a hot spot of a city may be considered. That is, since a plurality of small cells is arranged in a specific region, assume that a difference in timing advance (TA) value between small cells, to which the UE is simultaneously connected, is small. That is, under a specific condition, several small cells may simultaneously receive the signal transmitted by the UE.

In the multi-connectivity mode, the UE may receive synchronization signals from a plurality of small cells and maintain downlink synchronization. In addition, the UE may receive several control signals such as PDCCH signals from the plurality of small cells and simultaneously or separately receive PDSCH signals, which are data, from the plurality of small cells. The UE may include one or more receivers for receiving data from the plurality of small cells. As such receivers, a minimum mean square error-interference rejection combining (MMSE-IRC) receiver for efficiently eliminating interference among the plurality of cells may be used. The UE may notify each cell of information about receiver performance in an initial cell connection step of each cell.

The signal received via the MMSE-IRC receiver may be expressed as shown in Equation 7 below. At this time, a system using $N_{TX}$ transmit antennas and $N_{RX}$ receive antennas is assumed.

$$r(k, l) = H_1(k, l)d_1(k, l) + \sum_{j=2}^{N_{BS}} H_j(k, l)d_j(k, l) + n(k, l) \quad \text{[Equation 4]}$$

In Equation 4, k means a k-th subcarrier of a specific subframe and l means an l-th OFDM symbol. In Equation 4 below, $H_1(k,l)d_1(k,l)$ denotes a preferred signal received by the UE and $H_j(k,l)d_j(k,l)$ denotes an interference signal transmitted from a j-th (j>1) eNB. At this time, $H_1(k,l)$ and $H_j(k,l)$ respectively mean estimated radio channels, $d_j(k,l)$ denotes a $N_{Tx} \times 1$ transmission data vector and n(k,l) denotes noise. $\hat{d}_1(k,l)$ is a restored data signal when rank is $N_{stream}$ and may be expressed as shown in Equation 5 below.

$$\hat{d}_1(k,l) = W_{RX,1}(k,l)r(k,l) \quad \text{[Equation 5]}$$

In Equation 5, $W_{RX,1}(k,l)$ denotes a $N_{stream} \times N_{Rx}$ receiver weight matrix. In the MMSE-IRC receiver, $W_{Rx,1}(k,l)$ may be computed as shown in Equation 6 below.

$$W_{Rx,1}(k,l) = \hat{H}_1^H(k,l)R^{-1} \quad \text{[Equation 6]}$$

At this time, R may be computed using a transmitted DM-RS as shown in Equation 7 below.

$$R = P_1\hat{H}_1(k, l)\hat{H}_1^H(k, l) + \frac{1}{N_{sp}}\sum_{k,l \in DM-RS} \tilde{r}(k, l)\tilde{r}(k, l)^H \quad \text{[Equation 7]}$$

$$\tilde{r}(k, l) = r(k, l) - \hat{H}_1(k, l)d_1(k, l)$$

In Equation 10, $\hat{H}_1(k,l)$ denotes an estimated radio channel, $N_{sp}$ denotes the number of samples of the DM-RS, and P1 denotes transmit power. In addition, r(k,l) denotes a transmitted DM-RS and $\tilde{r}(k,l)$ denotes an estimated DM-RS.

3.3 PUSCH Resource Scheduling Method in Small Cell Environment

Assume that the embodiments of the present invention are performed in a wireless environment in which it is difficult to share scheduling information between small cells in real time. Accordingly, when the small cells perform scheduling of the UE, the radio resources used for the PUSCH by the small cells may overlap. In this case, the UE transmitting a PUSCH signal to a specific small cell may cause interference with another small cell, thereby deteriorating PUSCH reception performance.

Accordingly, in order to avoid such a phenomenon, the PUSCH regions assigned to the UE by two or more small cells configuring the multi-connectivity mode may be assigned so as not to overlap. For example, the small cells may divide PUSCH resources in the time domain or the frequency domain or may divide the PUSCH resources in the spatial domain if multiple antennas are supported. When the PUSCH resources are divided in the spatial domain, PUSCH transmission may be restricted to rank 1 in order to eliminate the interference signal. Information on the PUSCH resources divided in the time domain, the frequency domain, and/or the spatial domain may be shared in advance or at a long period via a wired or wireless link between scheduling cells.

In this case, two or more small cells may schedule PUSCH resources or PUCCH resources and transmit a PDCCH signal or E-PDCCH signal including uplink resource assignment information to the UE. The UE in the multi-connectivity mode may transmit a scheduling request (SR) via the uplink resource assignment region assigned by each of the two or more small cells.

4. Power Control Method in Multi-Connectivity Mode 4.1 PUSCH Transmit Power

In the multi-connectivity mode, PUSCH scheduling may be individually performed in several cells. Accordingly, ACK/NACK information of a PUSCH or CSI information for PDSCH scheduling is preferably transmitted to each cell. This is because the physical positions of scheduling cells are different and thus small cells in the multi-connectivity mode cannot share scheduling information in real time. Accordingly, a PUSCH signal for transmitting ACK/NACK or periodic CSI may be configured at a higher layer of an eNB and/or a UE to be transmitted to each small cell. When the PUCCH signal is configured to be transmitted to each small cell, the transmit power of the PUSCH signal may be determined as shown in Equation 8 below.

$$P_{PUSCH,c}(i) = \min\begin{cases} 10\log_{10}\left(\hat{P}_{CMAX,c}(i) - \sum_c \hat{P}_{PUCCH,c}(i)\right), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{cases} \quad \text{[Equation 8]}$$

where, $\hat{P}_{CMAX,c}$ denotes the linear value of $P_{CMAX,c}(i)$ which is maximum transmit power in an i-th subframe of a serving cell c set at a higher layer, $\hat{P}_{PUCCH,c}(i)$ denotes the linear value of $P_{PUCCH,c}(i)$ of a PUCCH transmitted in the i-th subframe of the serving cell c, $M_{PUSCH,c}(i)$ denotes the number of resource blocks (RBs) assigned for PUSCH signal transmission in the i-th subframe of the serving cell c, $P_{OPUSCH,c}(j)$ denotes a sum of $P_{O\_NOMINAL\_PUSCH,c}(j)$ which is a cell-specific parameter set at the higher layer and $P_{O\_UE\_PUSCH,c}(j)$ which is a UE-specific parameter set at the higher layer, $a_c(j)$ denotes a value set at the serving cell c, $PL_c$ denotes the path loss value of the serving cell c, $\Delta_{TF,c}(i)$ denotes a value changed according to MCS value, and $f_c(i)$ denotes a value corresponding to a power control command transmitted via a downlink control channel. That is, the PUSCH transmit power of the serving cell c may be determined using the remaining power other than the PUCCH transmit power transmitted at all the other serving cells.

In Equation 8, the path loss of the serving cell c may be measured as shown in Equation 9 below.

$$PL_c = \text{referenceSignalPower} - \text{higher layer filtered RSRP} \quad \text{[Equation 9]}$$

At this time, when the serving cell, to which the UE will transmit the PUCCH, does not belong to a timing advanced group (TAG), to which a primary cell belongs, the eNB may configure a reference cell to be used to measure path loss at the higher layer. At this time, a high layer filtered RSRP may be calculated as shown in FIG. 10 below.

$$F_n = (1-a) \cdot F_{n-1} + a \cdot M_n \quad \text{[Equation 10]}$$

In Equation 10, $M_n$ denotes a most recently received measurement value, $F_n$ denotes a filtered measurement value modified based on the received measurement result, $F_{n-1}$ denotes a previous filtered measurement value, $a=\frac{1}{2}^{(k/4)}$, and k denotes a constant value set at a higher layer. Accordingly, $M_n$ denotes an RSRP value measured and transmitted by a physical layer.

4.2 PUCCH Transmit Power Control Method—1

When the UE in the multi-connectivity mode is configured to transmit the PUCCH to several small cells, the transmit power of the PUCCH transmitted to the small cell c (that is, the serving cell c) may be determined as shown in Equation 11 below.

$$P_{PUCCH}(i) = \min \begin{Bmatrix} P_{CMAX,c}(i), \\ P_{0\_PUCCH,c} + PL_c + h_c(n_{CQI}, n_{HARQ}, n_{SR}) + \\ \Delta_{F\_PUCCH}(F) + \Delta_{TxD}(F') + g_c(i) \end{Bmatrix} \quad \text{[Equation 11]}$$

When the PUCCH is not transmitted in the subframe i of the small cell c, for a PUCCH transmit power control (TPC) command transmitted via DCI format 3 or 3A, the UE may assume that the transmit power of the PUCCH in the subframe i is calculated as shown in Equation 12 below.

$$P_{PUCCH,c}(i) = \min\{P_{CMAX,c}(i), P_{0\_PUCCH,c} + PL_c + g_c(i)\} \quad \text{[Equation 12]}$$

At this time, $P_{CMAX,c}(i)$ denotes a value defined as the maximum transmit power of the UE in the subframe i of the small cell c.

Here, $P_{0\_PUCCH,c}$ denotes a parameter indicating a sum of $P_{0\_NOMINAL\_PUCCH,c}$ which is a cell-specific parameter set with respect to the small cell c at the higher layer and $P_{0\_UE\_PUCCH,c}$ which is a UE-specific parameter. $h_c(n_{CQI}, n_{HARQ}, n_{SR})$ denotes a value determined according to the PUCCH format of the small cell c. At this time, $n_{CQI}$, $n_{HARQ}$, $n_{SR}$ respectively denote a CQI bit number, a HARQ ACK/NACK information bit number, and an SR information bit number, which are determined depending on whether CQI, ACK/NACK and/or SR are transmitted. In addition, $\Delta_{F\_PUCCH}(F)$ denotes a value set at the higher layer according to the PUCCH format and $\Delta_{TxD}(F')$ denotes a value set at the higher layer when the PUCCH is transmitted using two antenna ports and is set to "0" when the PUSCH is transmitted using a single antenna port. In addition, $g_c(i)$ denotes a value which may be acquired from a PUCCH transmit power control command transmitted via a downlink control channel. At this time, $P_{0\_NOMINAL\_PUCCH,c}$ and $P_{0\_UE\_PUCCH,c}$ used in Equation 11 may be set using the following methods.

(1) Method 1: $P_{0\_NOMINAL\_PUCCH,c}$ and $P_{0\_UE\_PUCCH,c}$ are independently set at the serving cells configuring the multi-connectivity mode.

(2) Method 2: $P_{0\_NOMINAL\_PUCCH,c}$ is commonly used at several cells and $P_{0\_UE\_PUCCH,c}$ may be differently set according to cells.

(3) Method 3: $P_{0\_NOMINAL\_PUCCH,c}$ may be differently set according to cells and $P_{0\_UE\_PUCCH,c}$ may be commonly set with respect to cells.

(4) Method 4: $P_{0\_NOMINAL\_PUCCH,c}$ and $P_{0\_UE\_PUCCH,c}$ may be commonly set with respect to the cells configuring the multi-connectivity mode.

When $P_{0\_NOMINAL\_PUCCH,c}$ and $P_{0\_UE\_PUCCH,c}$ are set according to the above-described methods, the small cells configuring the multi-connectivity mode may share at least one of $P_{0\_NOMINAL\_PUCCH,c}$ and $P_{0\_UE\_PUCCH,c}$ via a wired and/or wireless link. For example, the small cells may share $P_{0\_NOMINAL\_PUCCH,c}$ in Method 2, may share $P_{0\_UE\_PUCCH,c}$ in Method 3, and may share both values in Method 4.

However, the small cells in the multi-connectivity mode are connected via a non-ideal backhaul and thus cannot share scheduling information in real time. Accordingly, the above-described parameter values may be shared between a plurality of small cells when entering the multi-connectivity mode or periodically.

When the UE transmits the PUCCH signal to the small cells in the multi-connectivity mode, in Equation 11, $P_{CMAX,c}(i)$ indicating the maximum transmit power of the UE may be set according to cells. At this time, operation of the UE upon reaching the maximum power or minimum power according to cells may be defined. For example, when the PUCCH transmit power for a specific cell of the small cells reaches a maximum or minimum power value, the UE may ignore a power increasing/decreasing command transmitted via the PDCCH signal.

4.3 PUCCH Transmit Power Control Method—2

In the following embodiments of the present invention, assume that the small cells (that is, scheduling cells) configuring the multi-connectivity mode are close to each other and are network-synchronized with each other. That is, the UE may be configured to transmit a PUCCH signal to a plurality of small cells in the multi-connectivity mode using one uplink resource region. In this case, the PUCCH transmit power may be set to a maximum value of the power values for receiving the PUCCH by each small as shown in Equation 13 below.

$$P_{PUCCH}(i) = \min \begin{Bmatrix} \min_c P_{CMAX,c}(i), \\ \max_c P_{0\_PUCCH,c} + \max_c PL_c + h(n_{CQI}, n_{HARQ}, n_{SR}) + \\ \Delta_{F\_PUCCH}(F) + \Delta_{TxD}(F') + \max_c g_c(i) \end{Bmatrix} \quad \text{[Equation 13]}$$

In Equation 13, $$\min_c P_{CMAX,c}(i)$$

means a transmit power value defined in the small cell c having smallest transmit power in the subframe i among the small cells in the multi-connectivity mode, $$\max_c P_{0\_PUCCH,c}$$

denotes a value of a small cell c having a largest sum of $P_{0\_NOMINAL\_PUCCH,c}$ and $P_{0\_UE\_PUCCH,c}$ among the small cells in the multi-connectivity mode, a path loss value $PL_c^{max}$ denotes a downlink path loss value corresponding to highest path loss among path losses measured from a plurality of downlink channels. In addition, $h(n_{CQI}, n_{HARQ},$ $n_{SR}$) denotes a value changed according to the PUCCH format configured in the small cell c. For the small cell c, a value $_c{}^{max} g_c(i)$ is set to the largest value of values $g_c(i)$ calculated as shown in Equation 14 below.

$$g_c(i) = g_c(i-1) + \sum_{m=0}^{M-1} \delta_{PUCCH}(i-k_m) \quad \text{[Equation 14]}$$

In Equation 14, $g_c(i)$ is a value acquired by a PUCCH power control command transmitted via a downlink control channel, that is, means a current PUCCH power control adjustment state in the i-th subframe of the small cell c and g(0) means an initial value after resetting. At this time, $\delta_{PUCCH}$ is a UE-specific correction value and is a dB value according to a TPC command included in the PDCCH.

In another aspect of the present invention, the PUCCH transmit power may be calculated using the method shown in Equation 15 below instead of Equation 13.

$$P_{PUCCH}(i) = \quad \text{[Equation 15]}$$
$$\min \begin{Bmatrix} \min_c P_{CMAX,c}(i), \\ \max_c P_{0\_PUCCH,c} + \max_c PL_c + h(n_{CQI}, n_{HARQ}, n_{SR}) + \\ \Delta_{F\_PUCCH}(F) + \Delta_{T \times D}(F') + g_c(i) \end{Bmatrix}$$

For the parameter values used in Equation 15, refer to the description of the parameters shown in Equations 11 to 13. In Equation 15, a value $g_c(i)$ may be calculated as shown in Equation 16 or 17 below.

$$g(i) = g(i-1) + \sum_{m=0}^{M-1} \max_c \delta_{PUCCH,c}(i-k_m) \quad \text{[Equation 16]}$$

$$g(i) = g(i-1) + \max_c \sum_{m=0}^{M-1} \delta_{PUCCH,c}(i-k_m) \quad \text{[Equation 17]}$$

Equation 16 shows a method for calculating a value $g_c(i)$ of the small cell c having a largest value $\delta_{PUCCH}$ among the small cells in the multi-connectivity method and Equation 17 shows a method for calculating a value $g_c(i)$ of the small cell c having a largest sum of $\delta_{PUCCH}$.

4. 4 PUCCH Transmit Power Control Method—3

In the following embodiments of the present invention, assume that the small cells (that is, scheduling cells) configuring the multi-connectivity mode are close to each other and are network-synchronized with each other. That is, the UE may be configured to transmit a PUCCH signal to a plurality of small cells in the multi-connectivity mode using one uplink resource region. In this case, a plurality of scheduling cells may receive the PUCCH transmitted by the UE via the resource region.

At this time, the plurality of small cells may transmit power control commands for a single PUCCH to the UE. When the UE receives a command for increasing transmit power from one small cell, the UE preferably increases PUCCH power for stable reception of the PUCCH information. In addition, when commands for decreasing transmit power are received from all small cells, the UE preferably decreases PUCCH power.

When the power control command for increasing power to exceed $P_{CMAX,c}(i)$ of an arbitrary small cell c is received, the UE may maintain transmit power regardless of the power control commands of different small cells. That is, if the value $P_{CMAX,c}(i)$ is differently set according to small cells, when the transmit power reaches a value corresponding to $_c{}^{min}P_{CMAX,c}(i)$ (the minimum value of $P_{CMAX,c}(i)$ set per cell), the command for increasing the transmit power from the arbitrary small cell is ignored and the transmit power is maintained.

In addition, when a power control command for performing transmission to an arbitrary serving cell with power less than minimum transmit power is received, the UE may maintain transmit power without decreasing the transmit power when all the power control commands of the other small cells indicate decrease in transmit power. At this time, when any one small cell transmits a power control command for increasing power, the UE increases transmit power. When the PUCCH is not transmitted, the PUCCH power control command transmitted via DCI format 3/3A is used to calculate the transmit power of the subframe i using Equation 18 below.

$$P_{PUCCH}(i) = \min \left\{ \min_c P_{CMAX,c}(i), P_{0\_PUCCH} + PL_c + g_c(i) \right\} \quad \text{Equation 18}$$

Equation 18 shows a method for calculating PUCCH transmit power with respect to a small cell c having a smallest maximum transmit power of a plurality of small cells currently configuring the multi-connectivity mode.

4.5 PUCCH Transmit Power Calculation Method

Hereinafter, a method for calculating PUCCH transmit power based on the PUCCH transmit power control methods described in Chapters 4.2 to 4.4 will be described.

Figure 17:
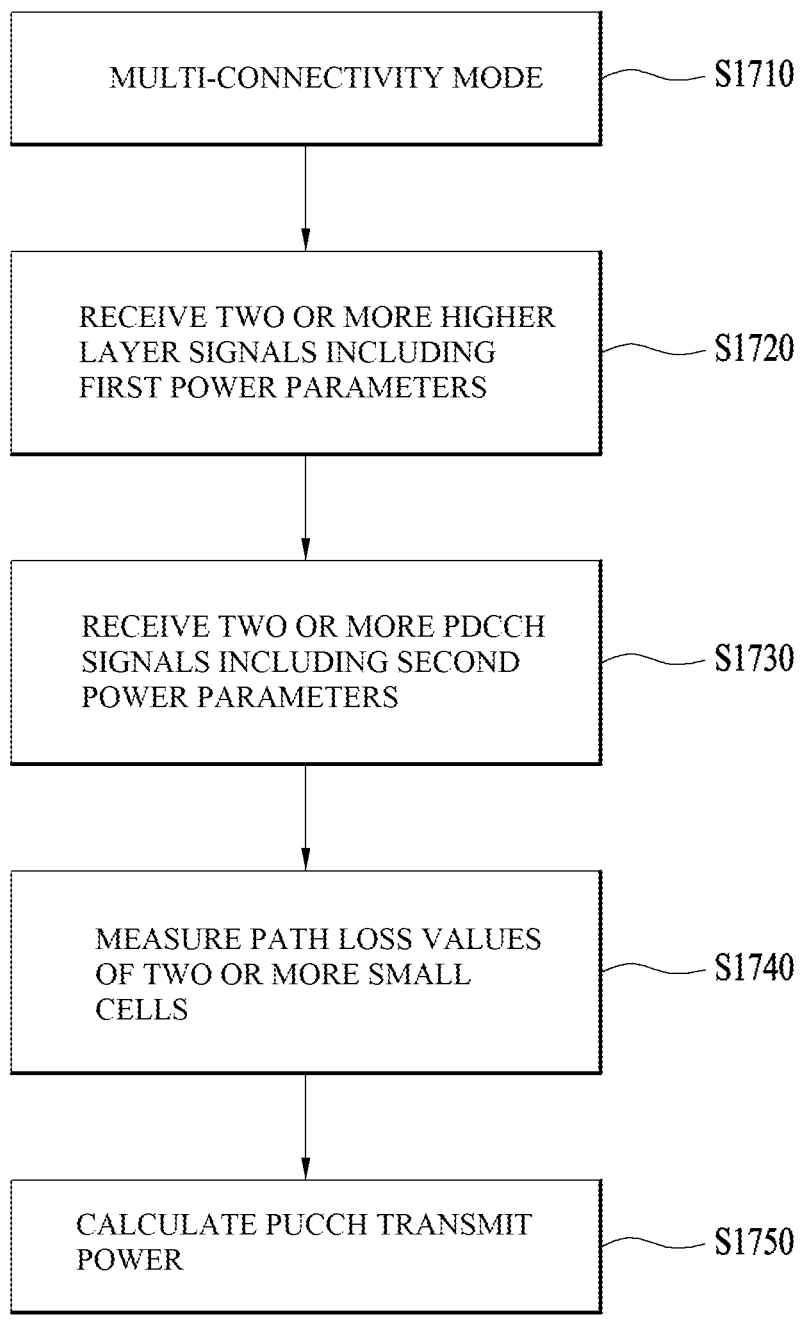
FIG. 17 is a diagram showing one method for calculating PUCCH transmit power.

FIG. 17 is a diagram showing one method for calculating PUCCH transmit power.

A UE and two or more small cells may configure a multi-connectivity mode. For the multi-connectivity mode, refer to Chapter 3 (S1710).

The UE may receive higher layer signals from the two or more small cells. At this time, the higher layer signals may include first power parameters set at the higher layer of each small cell. At this time, the first power parameters may include one or more of $P_{0\_NOMINAL\_PUCCH,c}$, $P_{0\_UE\_PUCCH,c}$, $\Delta_{F\_PUCCH}(F)$ and $\Delta_{TxD}(F')$ (S1720).

In addition, the UE may receive a PDCCH signal including second power parameters from the two or more small cells, respectively in each subframe. At this time, the second power parameters may include $g_c(i)$, $\delta_{PUCCH}$ and a parameter indicating a PUCCH format (S1730).

In addition, the UE may calculate the path loss values of the two or more small cells (S1740).

The UE may calculate the PUCCH transmit power using the methods shown in Equations 13 to 18 based on the first power parameters, the second power parameters and the path loss values respectively received in steps S1720, S1730 and S1740.

4.5 Power Headroom Reporting Method

The UE notifies the eNB (that is, the small cell or the marco cell) of the transmit power state thereof in the form of a power headroom report (PHR). The PHR may include two reporting types, that is, type 1 and type 2. At this time, the type 1 PHR indicates a method for calculating power headroom on the assumption that a UE transmits only a PUSCH and the type 2 PHR indicates a method for calculating power headroom on the assumption that a UE transmits both a PUSCH and a PUCCH.

As described above, since the UE may be configured to transmit ACK/NACK or CSI to several small cells using the PUCCH in the multi-connectivity mode, the type 2 PRH may be configured to be transmitted to several small cells.

If such PUCCH power control is assumed, when the PUSCH and the PUCCH are simultaneously transmitted to the small cell c in the subframe i, the type 2 PHR of the serving cell c may be calculated as shown in Equation 19 below.

$$PH_{type2,c}(i) = P_{CMAX,c}(i) - $$
$$10\log_{10}\left(10^{(10\log_{10}(M_{PUSCH,c}(i))+P_{O\_PUSCH,c}(j)+\alpha_c(j) \cdot PL_c+\Delta_{TF,c}(i)+f_c(i))/10} + 10^{(P_{0\_PUCCH,c}+PL_c+h_c(n_{CQI},n_{HARQ},n_{SR})+\Delta_{F\_PUCCH}(F)+\Delta_{T \times D}(F')+g_c(i))/10}\right)$$

[Equation 19]

If only the PUSCH is transmitted to the small cell c in the subframe i, the type 2 PHR may be calculated as shown in Equation 20 below.

$$PH_{type2,c}(i) = P_{CMAX,c}(i) - $$
$$10\log_{10}\left(10^{(10\log_{10}(M_{PUSCH,c}(i))+P_{O\_PUSCH,c}(j)+\alpha_c(j) \cdot PL_c+\Delta_{TF,c}(i)+f_c(i))/10} + 10^{(P_{0\_PUCCH,c}+PL_c+g_c(i))/10}\right)$$

[Equation 20]

In addition, when only the PUCCH is transmitted to the small cell c in the subframe i, the type 2 PHR may be calculated as shown in Equation 21 below.

$$PH_{type2,c}(i) = P_{CMAX,c}(i) - $$
$$10\log_{10}\left(10^{(P_{O\_PUSCH,c}(1)+\alpha_c(1) \cdot PL_c+f_c(i))/10} + 10^{(P_{0\_PUCCH,c}+PL_c+h_c(n_{CQI},n_{HARQ},n_{SR})+\Delta_{F\_PUCCH}(F)+\Delta_{T \times D}(F')+g_c(i))/10}\right)$$

[Equation 21]

In addition, when the PUSCH and the PUCCH are not transmitted to the small cell c in the subframe i, the type 2 PHR may be calculated as shown in Equation 22 below.

$$PH_{type2,c}(i) = $$
$$\tilde{P}_{CMAX,c}(i) - 10\log_{10}\left(10^{(P_{0\_PUSCH,c}(1)+\alpha_c(1)PL_c+f_c(i))/10} + 10^{(P_{0\_PUCCH,c}+PL_c+g_c(i))/10}\right)$$

[Equation 22]

At this time, $\tilde{P}_{CMAX,c}(i)$ is a value calculated on the assumption of MPR=0 dB, A-MPR=0 dB, P-MPR=0 dB and $\Box T_C$=0 dB.

5. Apparatuses

Figure 18:
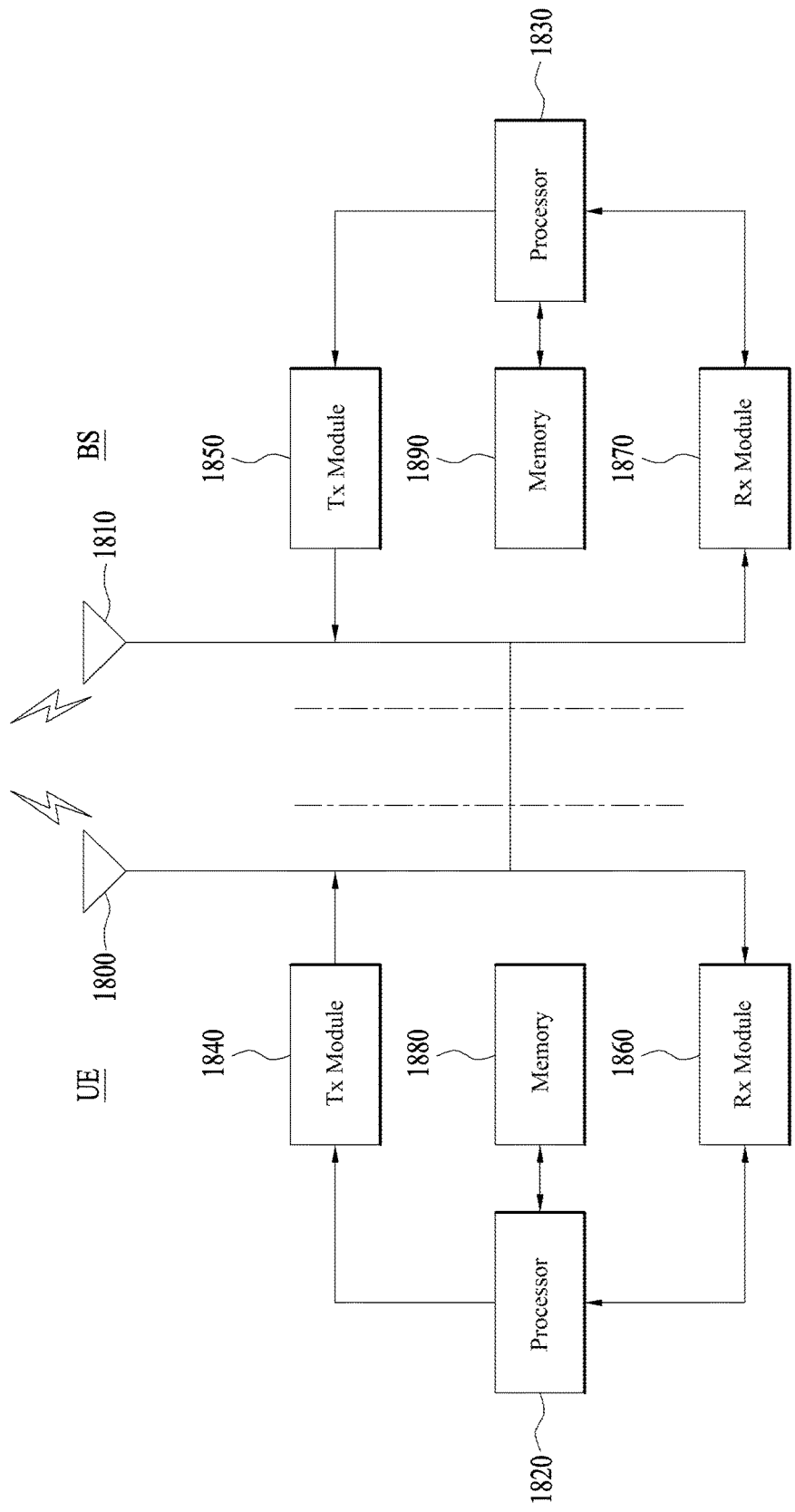
FIG. 18 shows an apparatus for implementing the methods described with reference to FIGS. 1 to 17.

Apparatuses illustrated in FIG. 18 are means that can implement the methods described before with reference to FIGS. 1 to 17.

A UE may act as a transmitter on a UL and as a receiver on a DL. An eNB may act as a receiver on a UL and as a transmitter on a DL.

That is, each of the UE and the eNB may include a Transmission (Tx) module 1840 or 1850 and a Reception (Rx) module 1860 or 1870, for controlling transmission and reception of information, data, and/or messages, and an antenna 1800 or 1810 for transmitting and receiving information, data, and/or messages.

Each of the UE and the eNB may further include a processor 1820 or 1830 for implementing the afore-described embodiments of the present disclosure and a memory 1880 or 1890 for temporarily or permanently storing operations of the processor 1820 or 1830.

The embodiments of the present invention may be performed using the components and functions of the above-described UE and eNB. For example, the processor of the UE may calculate PUSCH transmit power or PUCCH transmit power using the methods described in Chapters 1 to 4. At this time, the processor is connected to the transmitter and the receiver to transmit and receive parameters necessary to calculate transmit power. For a detailed description thereof, refer to Chapters 1 to 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method for controlling uplink transmit power of a user equipment (UE) in a radio access system supporting a multi-connectivity mode, the method performed by the UE and comprising:
receiving two or more higher layer signals including first power parameters;
receiving two or more physical downlink control channels (PDCCHs) including a second power parameter from two or more serving cells;
measuring path loss values of the two or more serving cells,
calculating two or more physical uplink control channel (PUCCH) transmit powers for each of the two or more serving cells in the multi-connectivity mode; and
transmitting respective PUCCHs to the two or more serving cells based on the two or more PUCCH transmit powers,
wherein the two or more PUCCH transmit powers are calculated based on the first power parameters, the second power parameter and the path loss values,
wherein, in the multi-connectivity mode, the UE maintains multiple connections with the two or more serving cells.

2. The method according to claim 1, wherein the two or more serving cells are connected to each other via a non-ideal backhaul link.

3. The method according to claim 1, wherein the two or more PUCCH transmit powers are calculated by:

$$P_{PUCCH}(i) = \min\begin{Bmatrix} P_{CMAX,c}(i), \\ P_{0\_PUCCH,c} + PL_c + h_c(n_{CQI}, n_{HARQ}, n_{SR}) + \\ \Delta_{F\_PUCCH}(F) + \Delta_{TxD}(F') + g_c(i) \end{Bmatrix}$$

where, $P_{CMAX,c}(i)$ denotes maximum transmit power in a subframe i of a serving cell c, $P_{0\_PUCCH,c}$ denotes a sum of $P_{0\_NOMINAL\_PUCCH,c}$ which is a cell-specific parameter set with respect to the serving cell c at a higher layer and $P_{0\_UE\_PUCCH,c}$ which is a UE-specific parameter, $h_c(n_{CQI}, n_{HARQ}, n_{SR})$ denotes a parameter depending on a PUCCH format of the serving cell c, $n_{CQI}$, $n_{HARQ}$, and $n_{SR}$ respectively denoting a channel status information (CQI) bit number, an ACK/NACK information bit number, and a scheduling request (SR) information bit number, $\Delta_{F\_PUCCH}(F)$ denotes a value set at the higher layer according to a PUCCH format, $\Delta_{TxD}(F')$ denotes a value set at the higher layer to be used when the UE transmits the PUCCH signals via two antenna ports, $g_c(i)$ denotes a value acquired from a PUCCH power control command transmitted via a physical downlink control channel (PDCCH), and c denotes an index of each of the two or more serving cells in the multi-connectivity mode.

4. The method according to claim 3, wherein $P_{0\_NOMINAL\_PUCCH,c}$ is a value commonly set with respect to the two or more serving cells and $P_{0\_UE\_PUCCH,c}$ is a value individually set with respect to the two or more serving cells.

5. The method according to claim 3, wherein $P_{0\_NOMINAL\_PUCCH,c}$ is a value individually set with respect to the two or more serving cells and $P_{0\_UE\_PUCCH,c}$ is a value commonly set with respect to the two or more serving cells.

6. The method according to claim 3, wherein the first power parameters include at least one of $P_{0\_NOMINAL\_PUCCH,c}$, $P_{0\_UE\_PUCCH,c}$, $\Delta_{F\_PUCCH}(F)$ and $\Delta_{TxD}(F')$.

7. The method according to claim 1, further comprising:
transmitting a power headroom report to each of the two or more serving cells,
wherein the power headroom report is calculated based on the two or more PUCCH transmit powers for each of the two or more serving cells.

8. A user equipment (UE) for controlling uplink transmit power in a radio access system supporting a multi-connectivity mode, the UE comprising:
a transmitter;
a receiver; and
a processor connected to the transmitter and the receiver to control the uplink transmit power,
wherein the processor is configured to:
receive, by using the receiver, two or more higher layer signals including first power parameters,
receive, by using the receiver, two or more physical downlink control channels (PDCCHs) including a second power parameter from two or more serving cells, measure path loss values of the two or more serving cells, calculate two or more physical uplink control channel (PUCCH) transmit powers for each of the two or more serving cells in the multi-connectivity mode, and transmit, by using the transmitter, respective PUCCHs to the two or more serving cells based on the two or more PUCCH transmit powers, wherein the two or more PUCCH transmit powers are calculated based on the first power parameters, the second power parameter and the path loss values, and wherein, in the multi-connectivity mode, the UE maintains multiple connections with the two or more serving cells.

9. The UE according to claim 8, wherein the two or more serving cells are connected to each other via a non-ideal backhaul link.

10. The UE according to claim 9, wherein $P_{0\_NOMINAL\_PUCCH,c}$ is a value commonly set with respect to the two or more serving cells and $P_{0_{13}\_UE\_PUCCH,c}$ is a value individually set with respect to the two or more serving cells.

11. The UE according to claim 9, wherein $P_{0\_NOMINAL\_PUCCH,c}$ is a value individually set with respect to the two or more serving cells and $P_{0\_UE\_PUCCH,c}$ is a value commonly set with respect to the two or more serving cells.

12. The UE according to claim 9, wherein the first power parameters include at least one of $P_{0\_NOMINAL\_PUCCH,c}$, $P_{0\_UE\_PUCCH,c}$, $\Delta_{F\_PUCCH}(F)$ and $\Delta_{TxD}(F')$.

13. The UE according to claim 9, wherein the processor is further configured to:

transmit, by using the transmitter, a power headroom report to each of the two or more serving cells, and wherein the power headroom report is calculated based on the two or more PUCCH transmit powers for each of the two or more serving cells.

14. The UE according to claim 8, wherein the two or more PUCCH transmit powers are calculated by:

$$P_{PUCCH}(i) = \min\left\{\begin{array}{l} P_{CMAX,c}(i) \\ P_{0\_PUCCH,c} + PL_c + h_c(n_{CQI}, n_{HARQ}, n_{SR}) + \\ \Delta_{F\_PUCCH}(F) + \Delta_{TxD}(F') + g_c(i) \end{array}\right\}$$

where, $P_{CMAX,c}(i)$ denotes maximum transmit power in a subframe i of a serving cell c, $P_{0\_PUCCH,c}$ denotes a sum of $P_{0\_NOMINAL\_PUCCH,c}$ which is a cell-specific parameter set with respect to the serving cell c at a higher layer and $P_{0\_UE_{13}\_PUCCH,c}$ which is a UE-specific parameter, $h_c(n_{CQI}, n_{HARQ}, n_{SR})$ denotes a parameter depending on a PUCCH format of the serving cell c, $n_{CQI}$, $n_{HARQ}$, and $n_{SR}$ respectively denoting a channel status information (CQI) bit number, an ACK/NACK information bit number, and a scheduling request (SR) information bit number, $\Delta_{F\_PUCCH}(F)$ denotes a value set at the higher layer according to a PUCCH format, $\Delta_{TxD}(F')$ denotes a value set at the higher layer to be used when the UE transmits the PUCCH signals via two antenna ports, $g_c(i)$ denotes a value acquired from a PUCCH power control command transmitted via a physical downlink control channel (PDCCH), and c denotes an index of each of the two or more serving cells in the multi-connectivity mode.

* * * * *